United States Patent
Okumura et al.

(10) Patent No.: US 8,508,852 B2
(45) Date of Patent: Aug. 13, 2013

(54) LENS SHEET, DISPLAY PANEL, AND ELECTRONIC APPARATUS

(75) Inventors: Hiroshi Okumura, Kanagawa (JP); Jin Matsushima, Kanagawa (JP); Hiroshi Tanabe, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 114 days.

(21) Appl. No.: 13/233,774

(22) Filed: Sep. 15, 2011

(65) Prior Publication Data
US 2012/0063009 A1 Mar. 15, 2012

(30) Foreign Application Priority Data

Sep. 15, 2010 (JP) ................. 2010-206556
May 6, 2011 (JP) ................. 2011-103476

(51) Int. Cl.
*G02B 27/10* (2006.01)
(52) U.S. Cl.
USPC ........................................ 359/619; 359/620
(58) Field of Classification Search
USPC ................................................ 359/619, 620
See application file for complete search history.

(56) References Cited

U.S. PATENT DOCUMENTS
2005/0270651 A1* 12/2005 Boettiger et al. ............. 359/618

FOREIGN PATENT DOCUMENTS

| JP | 06-332354 | 12/1994 |
|----|-----------|---------|
| JP | 07-281181 | 10/1995 |
| JP | 2000-292858 | 10/2000 |
| JP | 2004-280087 | 10/2004 |
| JP | 2005-208567 | 8/2005 |
| JP | 2008-203430 | 9/2008 |
| JP | 2009-037218 | 2/2009 |
| JP | 2010-160466 | 7/2010 |
| WO | WO 95/09372 | 4/1995 |

OTHER PUBLICATIONS

ISO/FDIS 9241-303, Ergonomics of human-system interaction—part 303 Requirements for electronic visual displays.

* cited by examiner

*Primary Examiner* — William Choi
(74) *Attorney, Agent, or Firm* — Young & Thompson

(57) ABSTRACT

To suppress bad shaping generated due to fusion of neighboring cylindrical lenses in a lens sheet formed by using an ultraviolet curable resin, for example. A lens sheet includes: a substrate formed with a transparent material; a plurality of protruded lines provided on the substrate in parallel at a specific pitch; and a plurality of cylindrical lenses, each of which is provided between the plurality of protruded lines on the substrate. The protruded line for forming the lens is designed to be constituted with a set of two lines, i.e., a left protruded line and a right protruded line, to suppress fusion of the neighboring lenses.

11 Claims, 18 Drawing Sheets

| e (mm) | D (mm) | θ (deg.) |
|---|---|---|
| 50 | 200 | 29.4 |
| | 300 | 19.3 |
| | 400 | 14.4 |
| | 750 | 7.7 |
| 74 | 200 | 45.5 |
| | 300 | 29.0 |
| | 400 | 21.5 |
| | 750 | 11.4 |

LENS SHEET, DISPLAY PANEL, AND ELECTRONIC APPARATUS

CROSS-REFERENCE TO RELATED APPLICATIONS

This application is based upon and claims the benefit of priority from Japanese patent application No. 2010-206556, filed on Sep. 15, 2010, and Japanese patent application No. 2011-103476, filed on May 6, 2011, the disclosure of which is incorporated herein in its entirety by reference.

BACKGROUND OF THE INVENTION

1. Field of the Invention

The present invention relates to a lens sheet used for a display device capable of displaying different images to a plurality of viewpoints, a display panel, and an electronic apparatus.

2. Description of the Related Art

Recently, developments for displaying different images to a plurality of viewpoints in a liquid crystal display device have been conducted actively. For example, disclosed are a display device which simultaneously provides different images to a plurality of observers located in different directions as depicted in Japanese Unexamined Patent Publication Hei 06-332354 (Paragraphs 0070-0073, FIG. 10: Patent Document 1), a stereoscopic image display device as depicted in Japanese Unexamined Patent Publication 2005-208567 (Paragraphs 0009-0012, FIG. 41: Patent Document 2), etc.

All of those display devices depicted in Patent Documents are characterized to use a lenticular lens formed with cylindrical lenses to display a plurality of images to arbitrary different directions in a distributed manner.

FIGS. 15A and 15B shows a related technique, in which FIG. 15A shows a sectional view of a display panel having a plurality of viewpoints using a lenticular lens sheet (simply referred to as "lens sheet" hereinafter), and FIG. 15B is a fragmentary enlarged sectional view of the lens sheet shown in FIG. 15A. Hereinafter, explanations will be provided by referring to the drawings.

As shown in FIG. 15A, a display panel 300 includes a lens sheet 310 and an LCD (Liquid Crystal Display) panel 320. In the LCD panel 320, a thin film transistor (referred to as "TFT (Thin Film Transistor)" hereinafter) substrate 301 and a color filter (referred to as "CF (Color Filter) hereinafter") substrate 305 are laminated via a seal member 309, and a liquid crystal 308 is sealed between the TFT substrate 301 and the CF substrate 305.

The TFT substrate 301 includes, on a plane opposing to the CF substrate 305, a thin film element region 302 where a TFT pixel switch array, a signal line, a scanning line, a pixel electrode, a TFT driving circuit, and the like are formed and includes an alignment film 304 that has undergone rubbing processing. Further, a polarization plate 303 is provided on a plane that is on the opposing side of that plane.

In the meantime, the CF substrate 305 includes, on a plane opposing to the TFT substrate 301, a counter electrode and the like forming layer 306 where a counter electrode, a metal light-shielding film, and the like are formed, a CF layer 307 constituted with a color layer, a black matrix, an overcoat layer, and the like, and an alignment film 304 that has undergone the rubbing processing. Further, the CF substrate 305 includes a polarization plate 303 and the lens sheet 310 on a plane that is on the opposite side of that plane.

Further, a backlight module, a driving IC, a flexible print cable, and the like, not shown, are mounted to complete the display panel 300 constituted with a liquid crystal display device.

In general, the lens sheet 310 is manufactured by molding a resin, glass, or the like by using a die as disclosed in Japanese Unexamined Patent Publication 2004-280087 (Paragraph 0062: Patent Document 5) and Japanese Unexamined Patent Publication 2008-203430 (Paragraph 0025: Patent Document 6) or manufactured by using a nip roll as disclosed in Japanese Unexamined Patent Publication 2000-292858 (Paragraphs 0020-0022: Patent Document 7). WO95/09372 (pp. 21-25, FIG. 8: Patent Document 3) and Japanese Unexamined Patent Publication Hei 7-281181 (Paragraphs 0044-0052, FIG. 1: Patent Document 4) disclose a lens sheet that can be manufactured in a stable size at a low cost without using a die or the like.

As shown in FIG. 15B, the lens sheet 310 of the related technique includes lens-forming protruded lines 312 and cylindrical lenses 313 provided on a substrate 311. A resin, glass, or the like is used for the substrate 311, a resin is used for the protruded lines 312, and an ultraviolet curable resin, a thermosetting resin, or the like is used for the cylindrical lenses 313. The protruded lines shown in FIG. 15B are protruded linear structures. In some cases, a function of a liquid-repellent characteristic as depicted in Patent Document 3, a function of light-shielding characteristic as depicted in Patent Document 4, and the like may be given to the protruded lines 312.

However, the lens sheet manufactured by the low-cost manufacturing method of applying a resin depicted in Patent Documents 3, 4, and the like is low in the yield.

The length of the major-axis direction of each cylindrical lens of the lens sheet (referred to as "lens length" hereinafter) is equivalent to the longitudinal length of a screen size of a display device. In the meantime, the length in the minor-axis direction of the cylindrical lens (referred to as "lens width" hereinafter) is equivalent to the size of a pixel of the display device. The radius curvature of the cylindrical lens is properly set according to the optical design of the display device, and the height of the lens (referred to as "lens height" hereinafter) is determined from the radius curvature of the lens and the size of the minor-axis of the lens. Note here that the "major-axis direction" is also referred to as a "center-axis direction" or an "extending direction", and the "minor-axis direction" is also referred to as a "radial direction".

Liquid crystal display devices have become more broadly distributed year after year. Nowadays, 40-inch to 60-inch types are the mainstream, and liquid crystal display devices of 100 inches or larger at the maximum are also developed. As a result, each lens size is increased. That is, the lens height becomes higher as well, so that an applied amount of a resin for the lens at the time of forming the lens becomes increased.

As a result, the lens resin may not be able stay in the sidewalls of the lens-forming protruded lines and overflow onto the top faces of the protruded lines in some cases. In that case, each lens resin may be fused into the resin of the neighboring lens, which results in having bad-shaped cylindrical lens.

For preventing the fusion between the neighboring lenses, the width of the protruded lines may be increased. However, in that case, the effective lens width becomes smaller, which causes deterioration of the light-use efficiency such as reduction in the light flux that can be used. In the display device using a lens sheet with a low light-use efficiency, it becomes difficult to project image information to a set viewpoint with a set light amount, so that the visual characteristic and the image display quality are deteriorated.

The present invention is designed in view of such issues described above. It is an exemplary object of the present invention to provide a lens sheet of a high light-use efficiency, which can be manufactured at a low cost and with high yield, and a display panel using the same, which is excellent in the visual characteristics and the display quality.

SUMMARY OF THE INVENTION

The lens sheet according to an exemplary aspect of the invention includes: a substrate formed with a transparent material; a plurality of first protruded lines provided on the substrate in parallel at a specific pitch; and a plurality of cylindrical lenses provided one each between the first protruded lines on the substrate, wherein each of the first protruded lines is constituted with a set of a plurality of protruded lines whose upper edges at least are isolated in a radial direction of the cylindrical lenses.

The cylindrical lenses may be defined to be formed with a liquid material applied and solidified between each of the first protruded lines on the substrate.

The display panel according to another exemplary aspect of the invention includes the lens sheet according to the present invention. The electronic apparatus according to the present invention includes the lens sheet according to the present invention.

BRIEF DESCRIPTION OF THE DRAWINGS

FIGS. 1A-1C show a lens sheet according to a first exemplary embodiment, in which FIG. 1A is a longitudinal sectional view taken along a line I-I of FIG. 1B, FIG. 1B is a plan view, and FIG. 1C is a fragmentary enlarged longitudinal sectional view of FIG. 1A;

FIGS. 2A and 2B show a manufacturing step (1) of the lens sheet according to the first exemplary embodiment, in which FIG. 2A is a longitudinal sectional view taken along a line II-II of FIG. 2B, and FIG. 2B is a plan view;

FIGS. 3A and 3B show a manufacturing step (2) of the lens sheet according to the first exemplary embodiment, in which FIG. 3A is a longitudinal sectional view taken along a line III-III of FIG. 3B, and FIG. 3B is a plan view;

FIGS. 6A and 6B show, in a simplified manner, an LCD panel that is laminated with the lens sheet according to the first exemplary embodiment, in which FIG. 6A is a longitudinal sectional view taken along a line VI-VI of FIG. 6B, and FIG. 6B is a plan view;

FIGS. 7A and 7B show, in a simplified manner, the display panel of the first exemplary embodiment where the LCD panel is laminated with the lens sheet according to the first exemplary embodiment, in which FIG. 7A is a longitudinal sectional view taken along a line VII-VII of FIG. 7B, and FIG. 7B is a plan view;

FIGS. 11A and 11B show a manufacturing step (1) of a lens sheet according to a third exemplary embodiment, in which FIG. 11A is a longitudinal sectional view taken along a line XI-XI of FIG. 11B, and FIG. 11B is a plan view;

FIGS. 13A and 13B show a manufacturing step (2) of the lens sheet according to the third exemplary embodiment, in which FIG. 13A is a longitudinal sectional view taken along a line XIII-XIII of FIG. 13B, and FIG. 13B is a plan view;

FIGS. 14A and 14B show, in a simplified manner, a display panel of the third exemplary embodiment acquired by laminating a TFT substrate with a CF substrate that includes the lens sheet of the third exemplary embodiment, in which FIG. 14A is a longitudinal sectional view taken along a line XIV-XIV of FIG. 14B, and FIG. 14B is a plan view;

FIGS. 15A and 15B show a related technique, in which FIG. 15A is a sectional view of a display panel having a plurality of viewpoints using a lens sheet, and FIG. 15B is a fragmentary enlarged sectional view of the lens sheet shown in FIG. 15A;

FIGS. 16A and 16B show fragmentary enlarged longitudinal sectional views of FIG. 1A, in which FIG. 16A is a first modification example, and FIG. 16B is a second modification example;

FIGS. 17A-17C show perspective views of electronic apparatuses to which the display panel of the first exemplary embodiment can be applied, in which FIG. 17A is a first example, FIG. 17B is a second example, and FIG. 17C is a third example; and FIGS. 18A and 18B show a lens sheet according to a fourth exemplary embodiment, in which FIG. 18A is a longitudinal sectional view taken along a line XVIII-XVIII of FIG. 18B, and FIG. 18B is a plan view.

DETAILED DESCRIPTIONS OF THE PREFERRED EMBODIMENTS

Next, best modes for embodying the present invention will be described in details by referring to some specific examples by using the accompanying drawings.

First Exemplary Embodiment

Figure 1A:
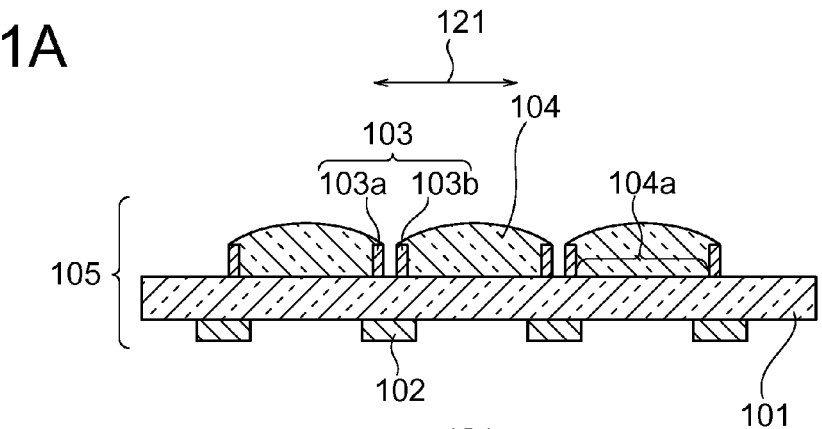
Figure 1B:
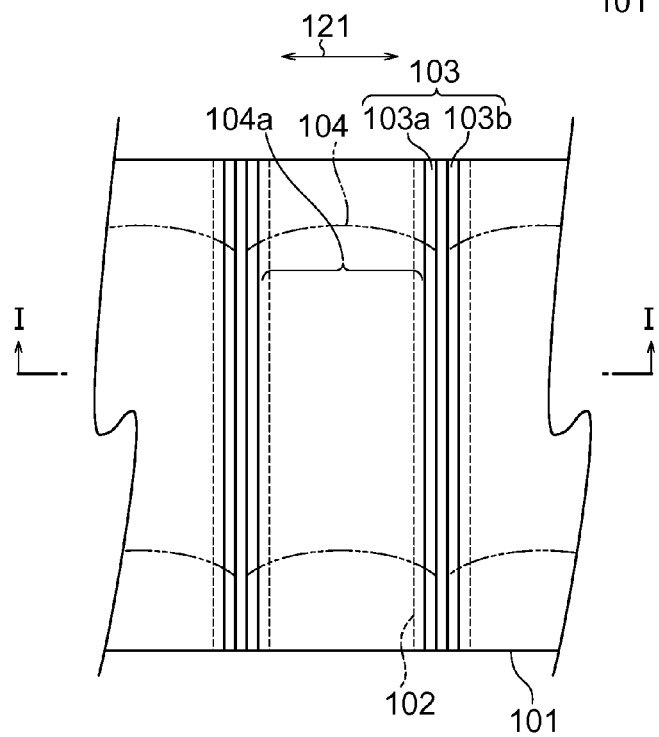
Figure 1C:
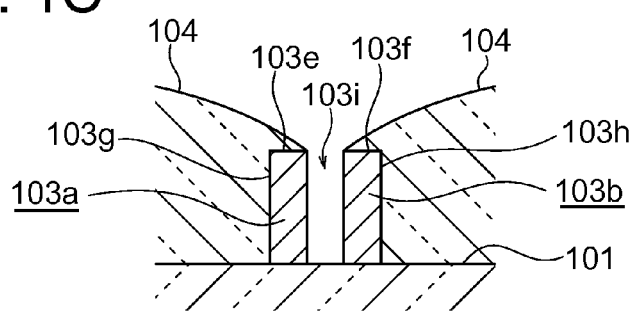
Figure 16A:
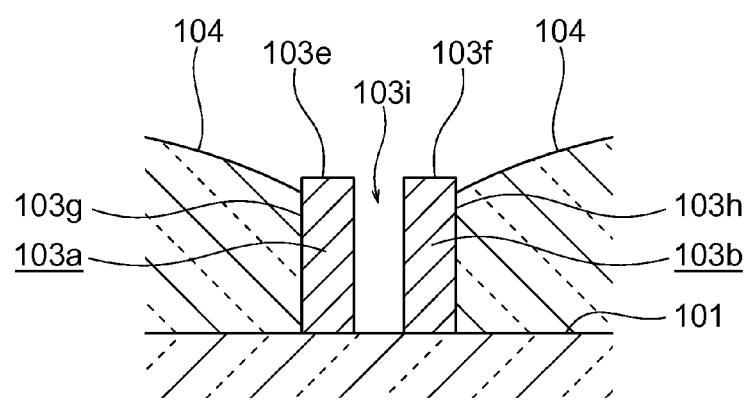
Figure 16B:
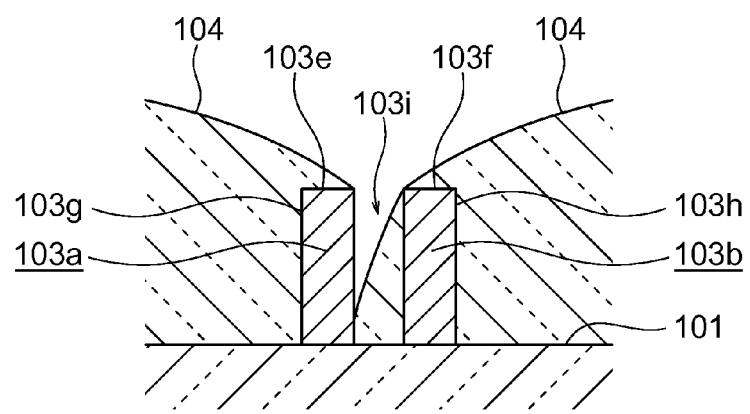

FIGS. 1A-1C show a lens sheet according to a first exemplary embodiment, in which FIG. 1A is a longitudinal sectional view taken along a line I-I of FIG. 1B, FIG. 1B is a plan view, and FIG. 1C is a fragmentary enlarged longitudinal sectional view of FIG. 1A. FIGS. 16A and 16B show fragmentary enlarged longitudinal sectional views of FIG. 1A, in which FIG. 16A is a first modification example, and FIG. 16B is a second modification example. Note here that the number of protruded lines and cylindrical lenses is smaller in FIG. 1A than the actual number, and a part of FIG. 1A is enlarged in FIG. 1B for implementing easy understanding (this is the same for other drawings). Hereinafter, the lens sheet according to the first exemplary embodiment will be described by referring to FIGS. 1A-1C and FIGS. 16A and 16B.

A lens sheet 105 of the first exemplary embodiment includes: a substrate 101 formed with a transparent material; a plurality of first protruded lines 103 (simply referred to as "protruded lines 103" hereinafter) provided on the substrate 101 in parallel at a specific pitch; and a plurality of cylindrical lenses 104 (simply referred to as "lenses 104" hereinafter), each of which is provided between the plurality of protruded lines 103 on the substrate 101. The lenses 104 are formed with a liquid material applied and solidified between the protruded lines 103 on the substrate 101. Each of the protruded lines 103 is a set of protruded lines constituted with a plurality of protruded lines, at least the upper edges (top end surface) thereof are being isolated along a radial direction 121 of the lenses 104. In the first exemplary embodiment, there are two protruded lines constituting the protruded line 103, and each of those protruded lines is called as a left protruded line 103a and a right protruded line 103b.

On the substrate 101, a liquid material is applied between each of the plurality of protruded lines 103, and the material in each section is solidified to form a plurality of lenses 104. At this time, when the liquid material applied on the substrate 101 goes over the protruded lines 103 and spreads, the neighboring liquid materials come in contact with each other, thereby forming bad-shaped lenses 104. Thus, in the first exemplary embodiment, the protruded line 103 is designed to be formed with the left protruded line 103a and the right protruded line 103b isolated along the radial direction 121. Thereby, when the liquid material is to go over the protruded line 103, the liquid material is stopped at a gap 103i between the left protruded line 103a and the right protruded line 103b. Therefore, it is possible to suppress spread of the liquid material applied on the substrate 101 by going over the protruded line 103. At this time, when the protruded lines 103 exhibit the liquid repellent characteristic for the liquid material, this effect is further reinforced. More specifically, through forming the protruded line 103 with the left protruded line 103a and the right protruded line 103b isolated along the radial direction 121, the liquid material stays on the upper edges (top end surfaces) 103e and 103f of the left protruded line 103a and the right protruded line 103b by the surface tension of the liquid material. Thus, it is possible to prevent fusion of the liquid material by the space of the gap 103i and to suppress generation of inferior products. Even if the liquid material goes over the left protruded line 103a or the right protruded line 103b, the liquid material can be stopped in the gap 103i.

The protruded line 103 includes the upper edges (top end surfaces) 103e and 103f on the ends of the side that does not come in contact with the substrate 101. The lenses 104 may come in contact only with the sidewalls 103g and 103h of the protruded line 103 as shown in FIG. 16A, or may also come in contact with the upper edges (top end surfaces) 103e and 103f as shown in FIG. 1C. From the point of light-use efficiency and contracting deformation caused due to solidification of the liquid material, it is desirable for the lenses 104 to be in contact with the upper edges (top end surfaces) 103e and 103f. However, in a case of a protruded line constituted with a single strip as in the case of the related technique, it becomes likely to generate inferior products with the structure in which the cylindrical lenses come in contact with the upper edge (top end surface) of the protruded line. In the meantime, with the first exemplary embodiment, the liquid material that is to go over the protruded line 103 can be stopped in the gap 103i between the left protruded line 103a and the right protruded line 103b even with the structure in which the lenses 104 come in contact with the upper edges (top end surfaces) 103e and 103f. Thus, it is possible to suppress generation of inferior products. Further, as shown in FIG. 16B, it is possible to suppress generation of inferior products by preventing fusion of the liquid material even if the liquid material leaks to the gap 103i from the upper edge (top end surface) 103f.

Figure 2A:
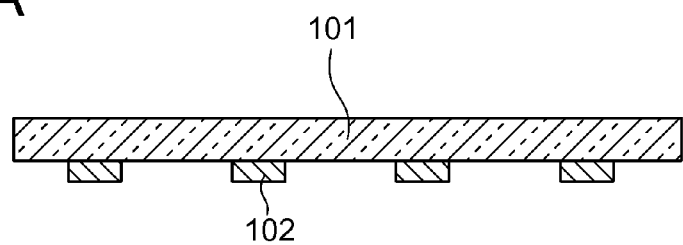
Figure 2B:
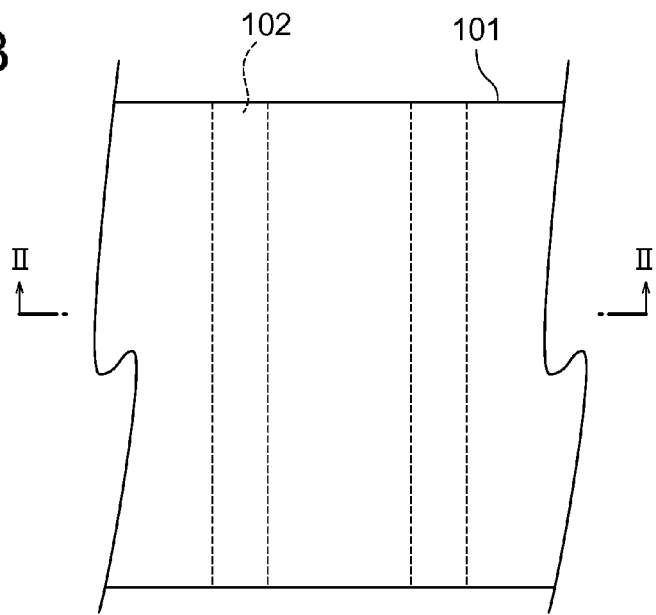
Figure 3A:
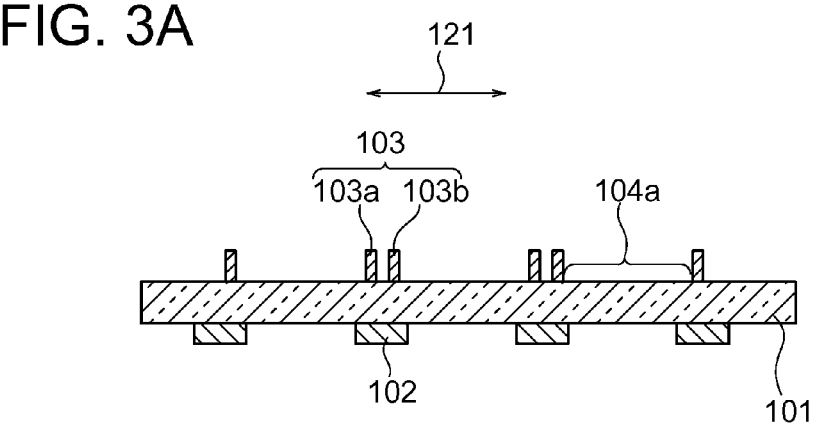
Figure 3B:
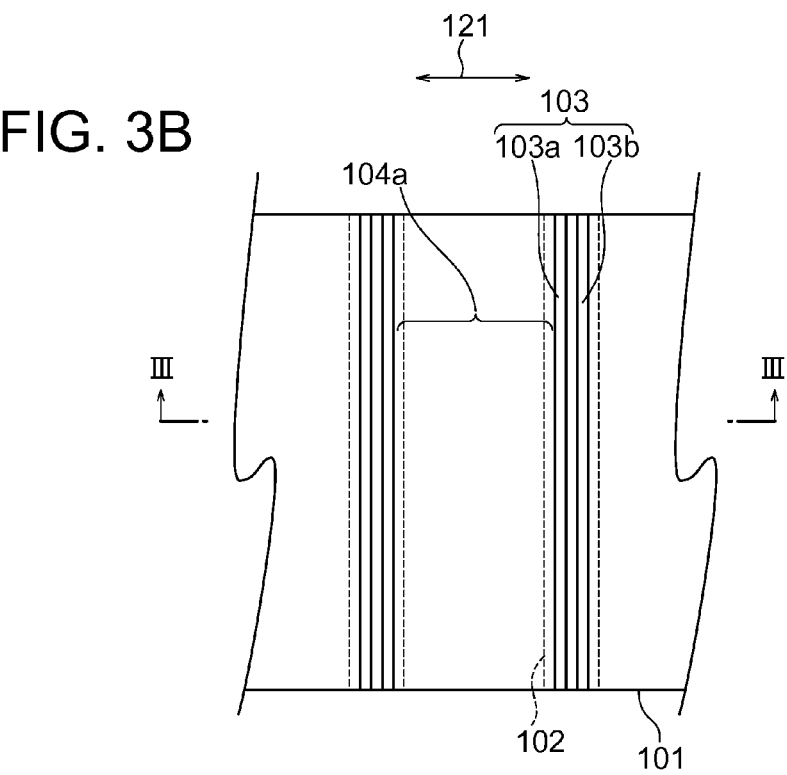
Figure 4A:
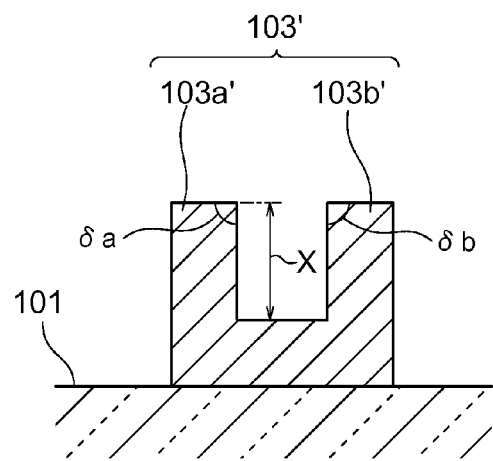
FIG. 4A is a sectional view showing a modification example of the first exemplary embodiment.
Figure 4B:
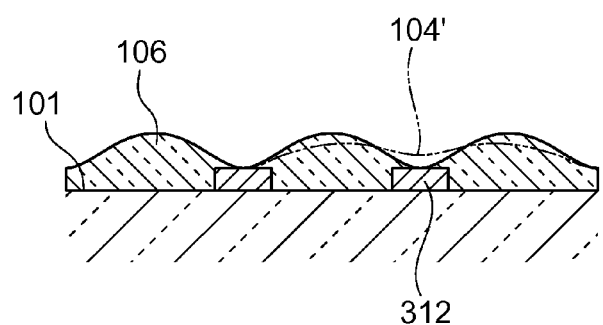
FIG. 4B is a sectional view showing a comparative example of the first exemplary embodiment.

FIGS. 2A and 2B show a manufacturing step (1) of the lens sheet according to the first exemplary embodiment, in which FIG. 2A is a longitudinal sectional view taken along a line II-II of FIG. 2B, and FIG. 2B is a plan view. FIGS. 3A and 3B show a manufacturing step (2) of the lens sheet according to the first exemplary embodiment, in which FIG. 3A is a longitudinal sectional view taken along a line III-III of FIG. 3B, and FIG. 3B is a plan view. Hereinafter, the manufacturing method of the lens sheet according to the first exemplary embodiment will be described by referring to FIGS. 1A-1C to FIGS. 3A and 3B.

First, on the substrate 101 formed with a transparent material (FIGS. 2A and 2B), a plurality of protruded lines 103 are formed in parallel at a specific pitch (FIGS. 3A and 3B). When forming the protruded lines 103, each of the protruded lines 103 is formed with a set of protruded lines constituted with a plurality of lines being isolated along the radial direction 121 of the cylindrical lenses formed later. In the first exemplary embodiment, there are two protruded lines, i.e., the left protruded line 103a and the right protruded line 103b, which constitute each of the protruded lines 103.

Subsequently, a liquid material is applied between the protruded lines 103 (i.e., in lens-forming regions 104a) on the substrate 101 and the liquid material is solidified to form one each of a plurality of lenses 104 between the protruded lines 103 (FIG. 1).

Further, as shown in FIG. 1C, when forming the protruded lines 103, the top end surfaces 103e, 103f may be formed on the ends of the protruded lines 103 on the side that does not come in contact with the substrate 101, and the liquid material may be brought into contact with the top end surfaces 103e, 103f when applying the liquid material. As the material of the protruded lines 103, a material exhibiting a liquid repellent characteristic for the liquid material may be used as well.

The lens sheet manufacturing method according to the first exemplary embodiment can provide same operations and effects as those of the lens sheet of the first exemplary embodiment described above.

Thereinafter, the first exemplary embodiment will be described in more details by referring to FIG. 1 to FIG. 5.

First, as shown in FIGS. 2A and 2B, a light shielding film 102 is patterned on one plane of the substrate 101 on the side opposing to one plane where the cylindrical lenses are formed, i.e., on one plane that is the side of the substrate 101 laminated with a display panel to be described later. The substrate 101 is formed with glass or a resin such as polyethylene naphthalate (PEN), polyether sulphone (PES), or polyethylene terephthalate (PET). The thickness of the substrate 101 is 1 mm or less. More desirably, it is 0.1 mm to 0.4 mm.

The light shielding film 102 is formed with a metal such as Cr, Ti, or a black resin, etc. The light shielding film 102 is used for suppressing disturbance of display caused due to optical scattering generated due to formation of the lens-forming protruded lines to be described later, and the light shielding film 102 is patterned in accordance with the external shape of the lens-forming protruded lines to be larger by one size than the external shape of the lens-forming protruded lines. In a case of a normal liquid crystal exposure process, the offset amount from the lens-forming protruded lines towards the outer side, i.e., the outer peripheral outline of the light shielding film 102 on the basis of the outer periphery of the lens-forming protruded lines, can be formed larger than the outer periphery of the lens-forming protruded lines by a range of about 1 µm. In a case where there is no disturbance in display due to formation of the lens-forming protruded lines, it is not necessary to form the light shielding films 102.

Next, as shown in FIGS. 3A and 3B, the lens-forming protruded lines 103 are formed on one plane on the side that is opposing to the surface of the substrate 101 where the light shielding films 102 are formed, i.e., on one plane that is on the side where the cylindrical lenses are formed.

The protruded lines 103 regulate the width of a plurality of unit cylindrical lenses provided on the substrate 101 in parallel. At the same time, the protruded lines 103 are required for separating and sectioning the lens-forming regions 104a used for forming each of the unit cylindrical lenses on the substrate 101, and each of the protruded lines 103 is normally constituted with a set of two lines, i.e., the left protruded line 103a and the right protrudes line 103b. However, for the lens at the end of the lens sheet, the protruded line 103 does not have to be formed with a set of two protruded lines. For the lens on the left end, only a protruded line corresponding to the right protruded line 103b is required. For the lens on the right end, only a protruded line corresponding to the left protruded line 103a is required. Note that "left, right, top, bottom" in this Specification means "left, right, top, bottom" of the drawings.

The protruded line 103 constituted with the left protruded line 103a and the right protruded line 103b is formed by a resin. In the first exemplary embodiment, a resist having a liquid repellent characteristic is used as a material for the resin. Regarding the size of the protruded line 103, each of the left and right lines is in a range of about 1 µm or more in width and 10 µm or less in height, which is a range that can be formed by a normal exposure process. In the first exemplary embodiment, the space between the left protruded line 103a and the right protruded line 103b is set as 4 µm, the width of each protruded lines is set as 15 µm, and the repeating pitch is set as 460 µm. The sectional shape of the left protruded line 103a and the right protruded line 103b is a rectangular shape, and the height thereof is set as 7 µm.

The protruded line 103 (the left protruded line 103a and the right protruded line 103b) in FIGS. 3A and 3B are completely isolated. However, the bottoms thereof may be connected as long as a groove is provided on the upper edge to separate the edge at least as in a protruded line 103' (left protruded line 103a' and right protruded line 103b') shown in FIG. 4A. Such shape can be formed through performing exposure by using a half-tone mask as depicted in Japanese Unexamined Patent Publication 2009-37218 (Paragraphs 0025-0028, FIG. 2: Patent Document 8), for example. However, in general, the half-tone mask is more expensive than the normal mask, and exposure using the half-tone mask is narrower in the process margin than the normal exposure.

Regarding the sectional shape of the upper edge of the two-piece set protruded line 103' connected in the bottom, it is desirable to be formed in a rectangular shape with high precision in order to prevent fusion of a lens resin dropped later. For example, it is desirable for each angle δa of the upper edge section facing the groove of the left protruded line 103a' and angle δb of the upper edge section facing the right protruded line 103b' to be 105 degrees or less. In a case where the angles δa and δb exceed 105 degrees or the upper edge sections are not in rectangular shapes but in arc shapes, the lens resin cannot stay within the protruded line upper edge sections and tend to be fused. In order to form the upper edge sections in rectangular shapes with high precision, the depth X of the groove is important. In order to satisfy the above-described condition, it is desirable for the depth X of the groove to be 2 µm or more.

After forming the protruded lines 103, ashing cleaning by $O_2$ plasma may be performed to improve the contact property of an ultraviolet curable resin for the substrate 101 and the lyophilic characteristic.

Next, as shown in FIG. 1, an ultraviolet curable resin is dropped between a set of neighboring protruded lines 103, i.e., in the lens-forming region 104a sectioned by the right protruded line 103b and the left protruded line 103a of the set neighboring on the right side, and an ultraviolet ray is irradiate to form the lens 104.

Through the above-described steps, the lens sheet 105 of the first exemplary embodiment is completed.

Now, a desirable shape of the lens 104 will be described by referring to an optical model of a lenticular-lens type stereoscopic display panel shown in FIG. 5A.

Figures 5A, 5B:
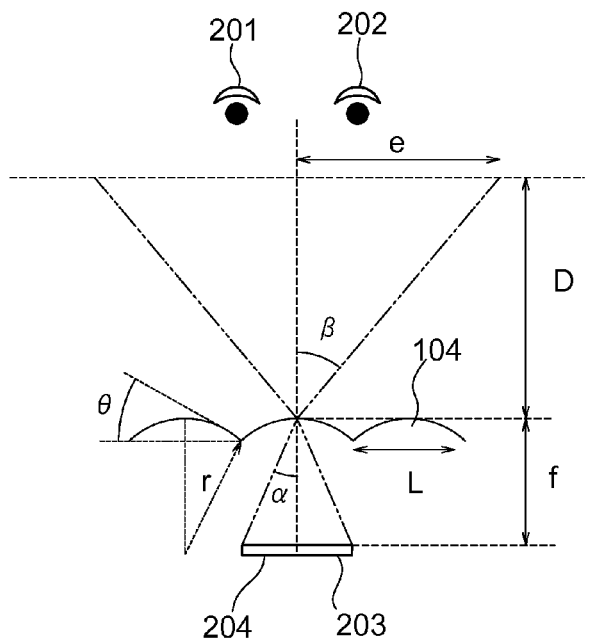
FIG. 5A is a schematic view showing an operation principle of a lenticular-lens type stereoscopic display panel.
FIG. 5B is a chart showing the distances D from the cylindrical lens to an observer, and lens contact angles θ calculated based on projection width e and standard refractive index n.

In FIG. 5A, an observer having a right eye 201 and a left eye 202 visually observes a right-eye pixel 203 by the right eye 201 through the lens 104 and visually observes a left-eye pixel 204 by the left eye 202 through the lens 104 at the same time. At last, the brain of the observer recognizes a synthesized image of those.

The right-eye pixel 203 and the left-eye pixel 204 as a set are located at a focal distance f from the lens 104, and each width is ½ of the lens pitch L. It is so defined that an incident angle to the lens 104 from the right-eye pixel 203 and the left-eye pixel 204 is α, and an exit angle thereof is β. It is so defined that the distance from the lens 104 to the observer is D, and a projection width of each pixel on a virtual plane in parallel to the lens 104 at the distance D from the lens 104 is e. Note here that a fine stereoscopic image is recognized when e matches with the space between the both eyes of the observer.

Mutual relationships regarding each of the parameters f, α, β, L, D, and e can be written as following Expressions 1 to 3 based on the optical rule and geometric relations.

$$D \times \tan \beta = e \quad \text{(Expression 1)}$$

$$f \times \tan \alpha = L/2 \quad \text{(Expression 2)}$$

$$n \times \sin \alpha = \sin \beta \quad \text{(Expression 3)}$$

Note here that n is the refractive index of the lens 104.

Next, considering the shape of the lens 104, the radius curvature r and the contact angle θ between the substrate 101 and the lens 104 in a case of the lens sheet can be written as following Expression 4 and 5.

$$r = f \times (n-1)/n \quad \text{(Expression 4)}$$

$$r \times \sin \theta = L/2 \quad \text{(Expression 5)}$$

When Expression 5 is transformed by using Expressions 1 to 4, a following expression can be acquired.

$$\sin \theta = n \times \tan \{\arcsin(\sin \beta/n)\}/(n-1)$$

The contact angle θ becomes a function of the exit angle β and the refractive index n, i.e., a function of the distance D from the lens to the observer, the projection width e, and the refractive index n.

"ISO/FDIS 9421-303 Ergonomics of Human-System Interaction Part 303: Requirements for Electronic Visual Displays" (Non-Patent Document 1) discloses the values of the distance D and the projection width e. That is, for the distance D, it is considered necessary to have 200 mm or more for children and 300 mm or more for adults, and a desired range is considered as 400 mm to 750 mm Regarding the projection width e, it is considered that 98% of the entire population is within a range of 50 mm to 74 mm.

The refractive index n of a normal resin is about 1.5 to the utmost. Thus, calculated results of the contact angle θ by taking the refractive index as 1.5 and the distance D as well as the projection width e are taken as the typical values are shown in a table of FIG. 5B. According to this table, the contact angle θ is in a range of 7 degrees to 46 degrees.

However, in general, the space between the both eyes of a child is narrower than the space (e.g., 74 mm) of an adult. Thus, the contact angle θ that is the calculation result acquired by taking the space e between the eyes as 74 mm and the distance D from the lens to the observer D as 200 mm, i.e., the value of the contact angle θ assuming a combination of the observing distance D fitted to a child and the space e between the both eyes of an adult, is not practical. Therefore, it is appropriate to set the value of the contact angle θ as a range of about 7 degrees to 30 degrees, and more desirably to set as a range of about 7 degrees to 22 degrees in order to acquire a display panel of an excellent display quality.

In a case where the contact angle θ is set as a range of 7 degrees to 22 degrees, for example, the lens height in a 40-inch high vision (1920×1080 pixels) LCD panel can be calculated as about 14 μm to 45 μm, since the pixel size is about 460 μm. Similarly, in a 60-inch high vision LCD panel whose pixel size is about 692 μm, the lens height may reach a range as high as about 21 μm to 67 μm.

When forming the lens 104 in the above height, a relatively great amount of resin is dropped. Thus, even if the protruded lines 103 have the liquid repellent characteristic, the resin practically cannot stay within the sidewalls of the protruded lines 103 and may overflow to the top faces thereof. As in a comparative example shown in FIG. 4B, in a case of a protruded line 312 constituted with a single strip, the neighboring lens resins 106 are easily fused with each other and the lens 104' in bad shape tends to be formed when the lens resin 106 overflows to the top face of the protruded line 312. Particularly, when the lens resin 106 overflows with tails, the bad shapes caused due to fusion becomes conspicuous.

Therefore, in order to improve the yield of the lens, it is effective to provide a set of two isolated left protruded line 103a and right protruded line 103b for the protruded line 103 having the liquid repellent characteristic between the neighboring lenses 104. In the case of the protruded line 312 constituted with a single protruded line as in a comparative example shown in FIG. 4B, it is possible to suppress fusion of the lens resin 106 through increasing the width of the protruded line 312. However, an excessive increase in the protruded line width results in deteriorating the light-use efficiency. Thus, in order to satisfy a trade-off between improving the yield of the lens and deteriorating the light-use efficiency, it is necessary to provide the left protruded line 103a and the right protruded line 103b of a relatively narrow width as a set of two protruded lines.

Note here that the lens contact angle θ depends on the liquid repellent characteristic of the protruded lines 103, the space with respect to the neighboring right protruded line 103b, the space with respect to the neighboring left protruded line 103a, the drop amount of the resin, and the like. However, each of the spaces with respect to the right protruded line 103b and the left protruded line 103a does not largely deviated from the pixel pitch, so that it is possible to control the contact angle θ with the drop amount of the resin when forming the lens.

In the first exemplary embodiment, the contact angle between the lens, which is acquired by dropping an ultraviolet curing resin same as the material of the lens 104 on a flat plate made of a same material as that of the substrate 101 and curing it in a free state, and the flat plate is 7 degrees. Further, the contact angle between the lens, which is acquired by dropping an ultraviolet curing resin same as the material of the lens 104 on a flat plate made of a same material as that of the protruded line 103 and curing it in a free state, and the flat plate is 80 degrees. Under such conditions, when the ultraviolet curing resin is dropped and cured on the lens forming region 104a between the right protruded line 103b and the left protruded line 103a on the substrate 101 including the two-piece set protruded line 103, the contact angle θ between the lens 104 to be formed and the substrate 101 can be set to 18 degrees by performing a conversion with an extended line of the radius curvature of the lens center part (vertex).

At this time, the lens resin overflows to the top face of the protruded line 103, and the lens 104 formed after curing the resin is in contact with the top face of the protruded line 103. The center part of the lens 104 forms an arc shape due to the surface tension of the resin. However, the outermost periphery of the lens 104 in contact with the protruded line 103 forms a shape displaced from the arc due to a tail of the resin in a region of about 12 μm in width. The displacement in the shape of the peripheral part of the lens 104 becomes a factor for deteriorating the light-use efficiency of the lens 104. In order to function as the lens 104 at least, about ⅓ of the lens width including the center part of the lens 104 only needs to form an arc shape which exhibits the light-converging characteristic. However, from the viewpoint of the light-use efficiency, it is naturally desirable for the lens to be in an arc form over the entire periphery. In a case of the protruded line 312 as in a comparative example shown in FIG. 4B, the lens resin 106 overflows with a tail onto the top face of the protruded line 312 as in the case of the first exemplary embodiment. The overflown range is about 20 μm at the minimum, and there is a variation of 10 μm or more. In order to acquire, with the single protruded line, a fine yield of the manufacturing steps of 99% or more as in the case of the protruded line with the two strips as a set, it is necessary to set the width as 86 μm. This width is a value larger by twice or more of 34 μm that is a total value of each of the widths of the left protruded line 103a and the right protruded line 103b of a set of two strips and the space therebetween. For that, the light-use efficiency is deteriorated.

Figure 6A:
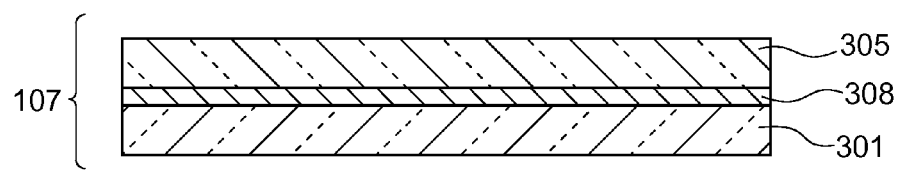
Figure 6B:
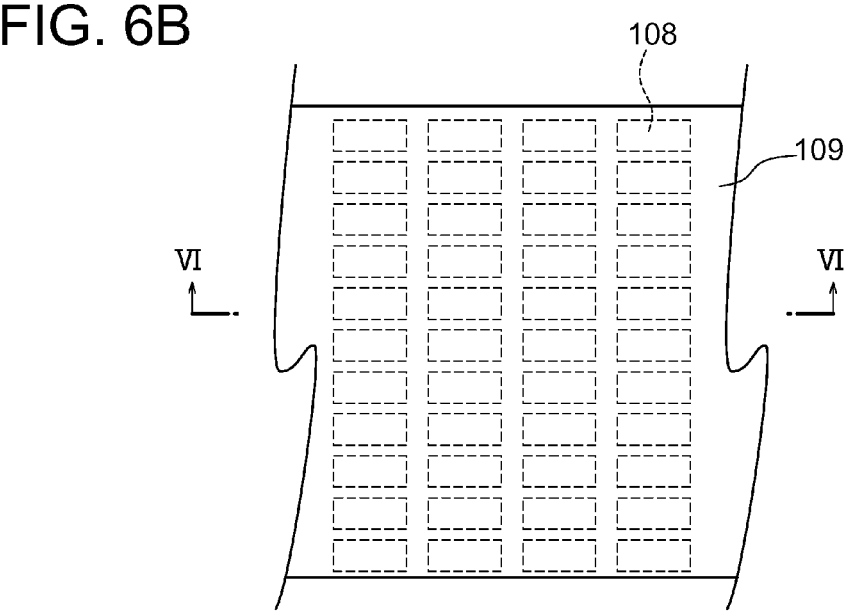
Figure 7A:
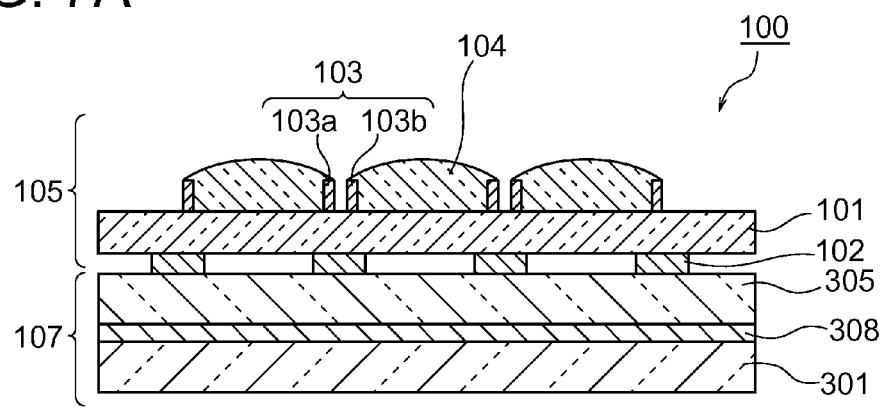
Figure 7B:
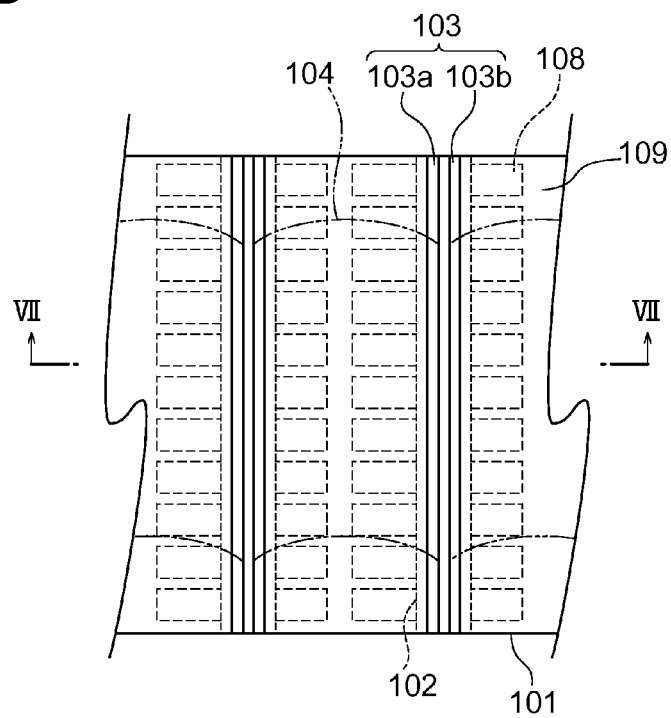

FIGS. 6A and 6B show, in a simplified manner, an LCD panel laminated that is with the lens sheet according to the first exemplary embodiment, in which FIG. 6A is a longitudinal sectional view taken along a line VI-VI of FIG. 6B, and FIG. 6B is a plan view. FIGS. 7A and 7B show, in a simplified manner, the display panel of the first exemplary embodiment where the LCD panel is laminated with the lens sheet according to the first exemplary embodiment, in which FIG. 7A is a longitudinal sectional view taken along a line VII-VII of FIG. 7B, and FIG. 7B is a plan view. Hereinafter, the display panel according to the first exemplary embodiment will be described by referring to the accompanying drawings.

A sectional shape of an LCD panel 107 to be laminated with the lens sheet 105 is shown in FIG. 6A, and a plan shape thereof is shown in FIG. 6B. The LCD panel 107 includes pixel apertures 108 and light shielding regions 109. The LCD panel 107 is in a structure in which a liquid crystal 308 is sealed between a TFT substrate 301 and a CF substrate 305. Each structural element other than the TFT substrate 301, the CF substrate 305, and the liquid crystal 308 is not shown.

Figure 15A:
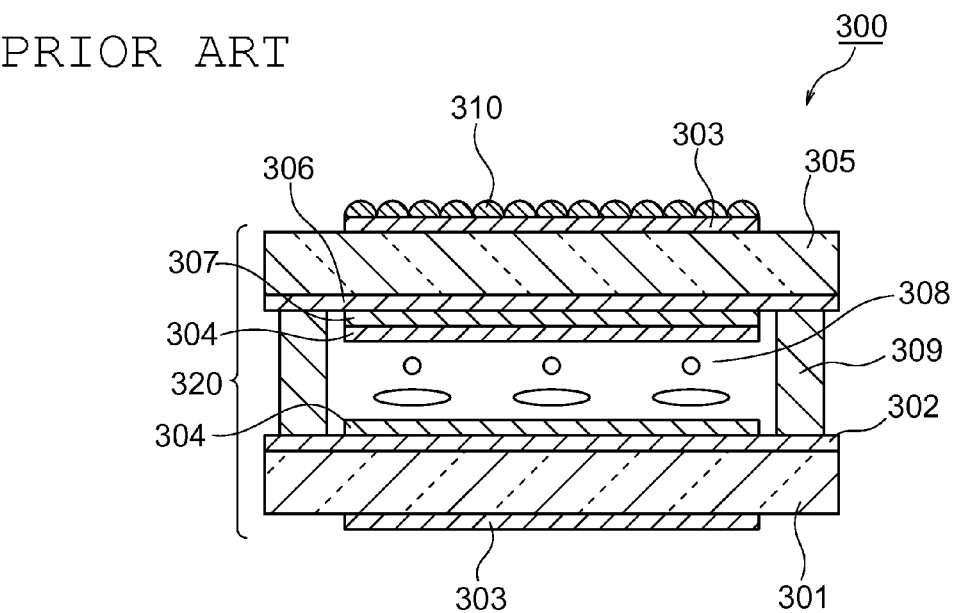
Figure 15B:
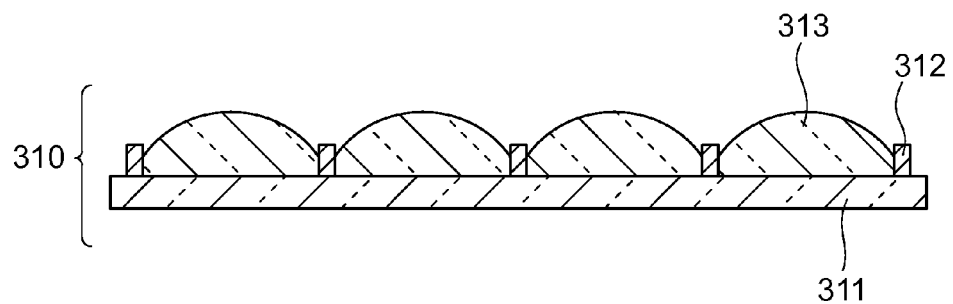

However, those are practically the same as the structural elements of the LCD panel 320 of a related technique shown in FIG. 15A.

Then, as shown in FIGS. 7A and 7B, the lens sheet 105 is laminated with the LCD panel 107. At this time, the lens 104 is placed to go over two pixels (two lines) of the right-eye pixel and the left-eye pixel. Through the above, a display panel 100 is completed. That is, the display panel 100 according to the first exemplary embodiment includes the lens sheet 105 of the first exemplary embodiment.

Figure 17A:
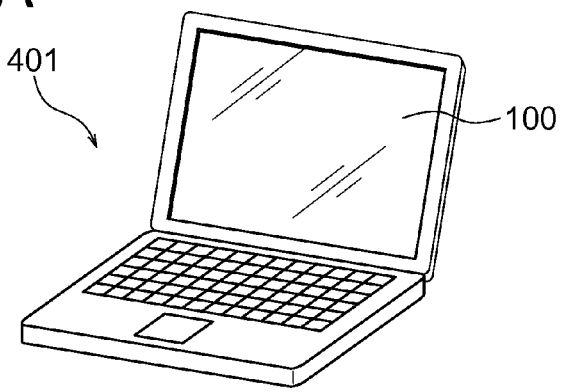
Figure 17B:
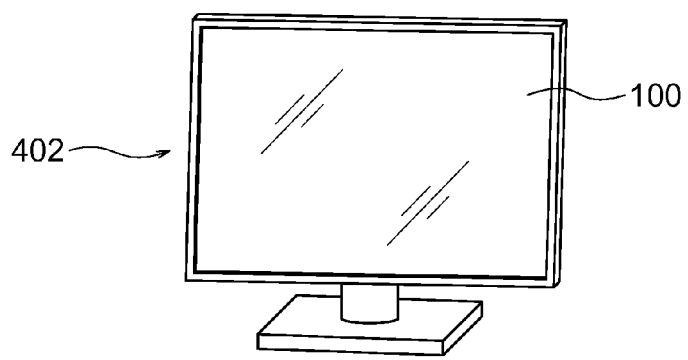
Figure 17C:
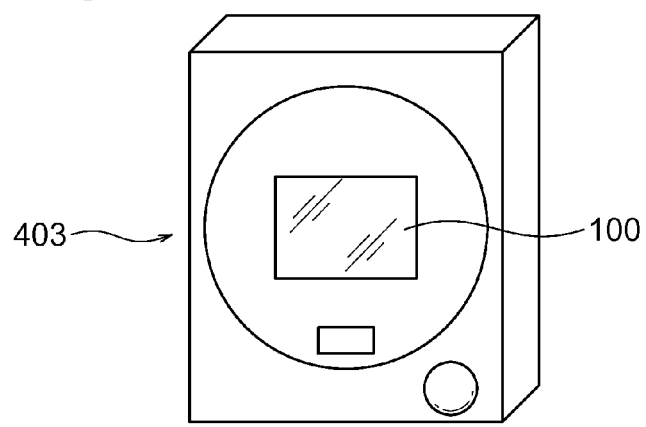

FIGS. 17A-17C show perspective views of electronic apparatuses to which the display panel of the first exemplary embodiment can be applied, in which FIG. 17A is a first example, FIG. 17B is a second example, and FIG. 17C is a third example. Hereinafter, explanations will be provided by referring to FIGS. 7A and 7B and FIGS. 17A-17C.

FIGS. 17A-17C show electronic apparatuses to which the display panel 100 of the first exemplary embodiment can be applied. As a way of example, a personal computer 401 (FIG. 17A), a pachinko game machine (FIG. 17B), a television 403 (FIG. 17C) are illustrated. However, other than those, the display panel 100 according to the first exemplary embodiment can also be applied to various kinds of electronic devices such as mobile phones, smartphones, mobile information terminals, game machines, digital cameras, digital video cameras, monitors of car navigation systems, onboard monitors, and the like. When glass or a low linear expansion film substrate is used for the substrate 101 of the lens sheet of the first exemplary embodiment, it becomes close to the linear expansion coefficient of the TFT substrate 301 and the CF substrate 305 in the case of the LCD panel 107, for example. Thus, the shift in the positions of the cylindrical lenses 104 and the pixels of the LCD panel 107 due to changes in the temperatures becomes small. Therefore, the use temperature range can be expanded.

The first exemplary embodiment described above makes it possible to provide, at a low cost, the display panel 100 and electronic apparatuses capable of displaying different images to a plurality of viewpoints, which are excellent in the visual characteristic and display quality.

While the first exemplary embodiment uses the arc-shaped lenses 104, aspherical lenses excellent in an aberration characteristic may also be used, provided that more minute shape control can be done therewith. In that case, the optical design of the aspherical lens is the same as the case shown in FIG. 5A, and the focal distance of the aspherical lens is also f.

As an exemplary advantage according to the invention, each of first protruded lines is structured with a plurality of protruded lines isolated along the radial direction. Thus, when the material of the cylindrical lenses is to go over the first protruded lines at the time of fabricating the lens sheet, the material can be stopped at the gaps between the plurality of protruded lines. This makes it possible to suppress the overflow and spread of the liquid material applied on the substrate by going over the first protruded lines. Thereby, fusion of the neighboring cylindrical lenses can be prevented, so that it is possible to manufacture the lens sheet of a high light-use efficiency with high yield at a low cost. Particularly, the effect of the present invention is remarkable in a case where the material of the cylindrical lenses is a liquid type.

Second Exemplary Embodiment

Figure 8A:
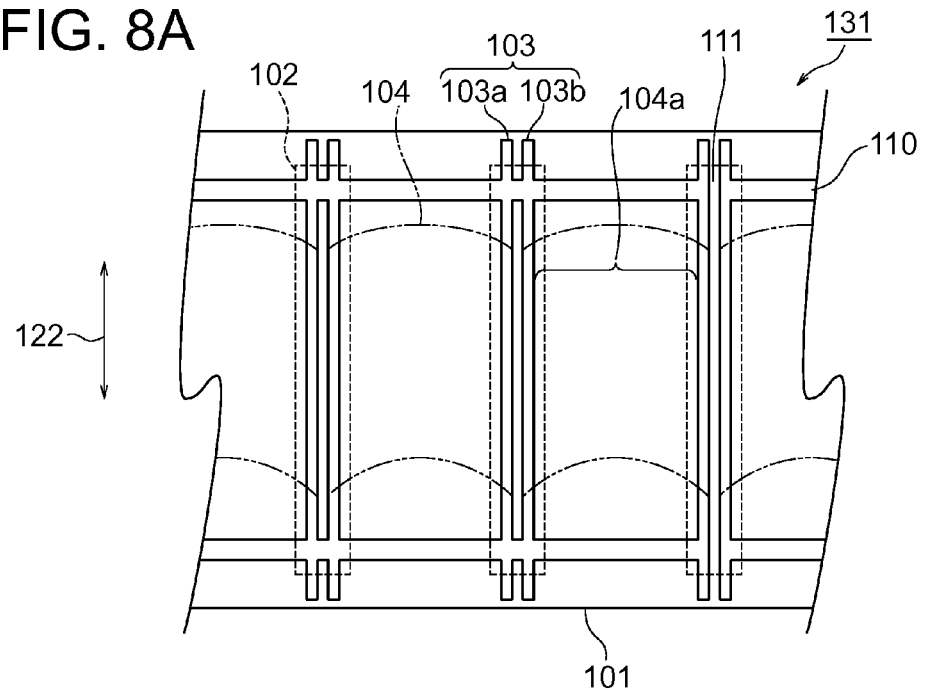
FIG. 8A is a plan view showing a lens sheet according to a second exemplary embodiment.

FIG. 8A is a plan view showing a lens sheet according to a second exemplary embodiment. Hereinafter, the lens sheet of the second exemplary embodiment will be described.

A lens sheet 131 of the second exemplary embodiment further includes a second protruded line 110 (simply referred to as "protruded line 110" hereinafter) provided on a substrate 101. The protruded line 110 is provided one each at both ends of a plurality of lenses 104 in a center axis direction 122. With the lens sheet 131, the length of the lens 104 in the center axis direction 122 can be formed precisely through providing the protruded line 110 at both ends of the lenses 104 in the center axis direction 122 and utilizing the gap of the protruded lines 103 as a sectioning part 111.

Further, the protruded line 110 may be sectioned via the two strips of the left protruded line 103a and the right protruded line 103b constituting the protruded line 103 at any one or more of a plurality of points (sectioning parts 111) which are in contact with a plurality of protruded lines 103. In that case, the stress by the protruded lines 110 can be eased by the sectioning parts 111, so that film exfoliation can be prevented.

Further, the both ends of the protruded line 103 in the center axis direction 122 may be formed to go through the protruded lines 110. In that case, it is possible to prevent the liquid material flown out by going over the protruded line 103 from flowing into the sectioning parts 111, so that generation of bad-shaped lenses 104 can be suppressed.

Figure 10A:
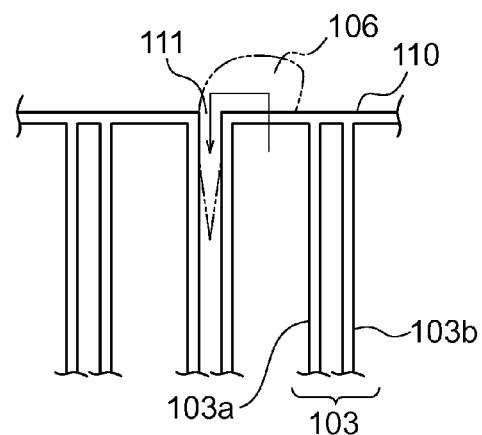
FIG. 10A is a plan view showing a second comparative example of the second exemplary embodiment.
Figure 10B:
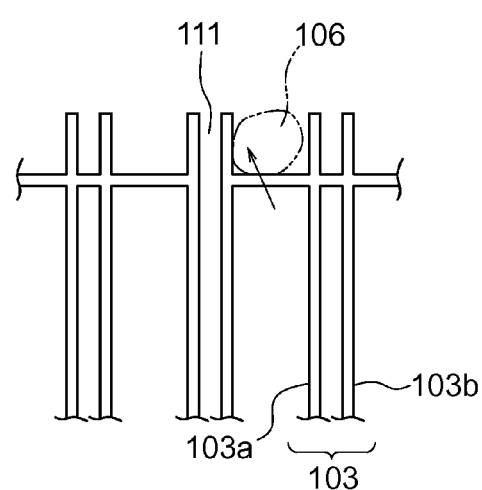
FIG. 10B is a plan view showing a part of the lens sheet according to the second exemplary embodiment.
Figure 10C:
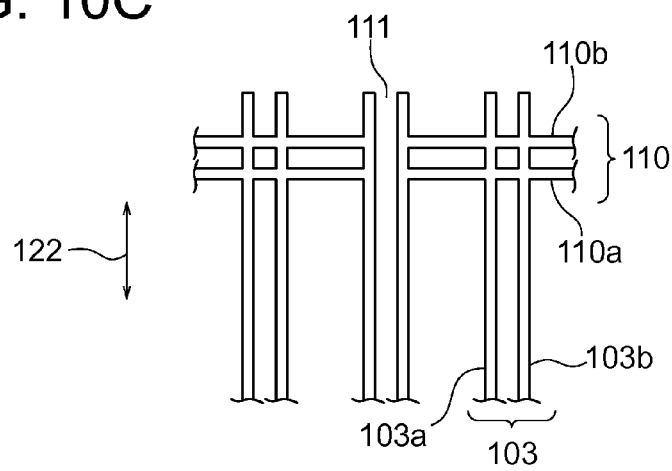
FIG. 10C is a plan view showing a modification example of the second exemplary embodiment.

Further, as in a modification example shown in FIG. 10C, each of the protruded lines 110 may be formed as a set of protruded lines constituted with a plurality of lines isolated in the center axis direction 122 of the lens. In this modification example, the protruded line 110 is constituted with two protruded lines 110a and 110b. In that case, it is possible to prevent the liquid material flown out by going over the protruded line 103 from flowing into the sectioning parts 111 more effectively.

The main steps of the manufacturing method of the lens sheet 131 are as follows. Before applying the liquid material, each of the protruded lines 110 is formed on the substrate 101 at positions to be the both ends of a plurality of lenses 104 in the center axis direction 122. When forming the protruded line 110, each of the protruded lines 110 is sectioned via the isolated two strips of the left protruded line 103a and the right protruded line 103b constituting the protruded line 103 at any one or more of a plurality of points (sectioning parts 111) which are in contact with a plurality of protruded lines 103. Further, when forming the protruded line 103, the both ends of the protruded line 103 in the center axis direction 122 may be formed to go through the protruded line 110. Furthermore, when forming the protruded lines 110, each of the protruded lines 110 may be formed as a set of protruded lines constituted with a plurality of lines isolated in the center axis direction 122 of the lenses 104 formed later.

Other structures of the lens sheet 131 of the second exemplary embodiment, operations, and the effects thereof are the same as those of the first exemplary embodiment. The second exemplary embodiment will be described in more details based on FIG. 8 to FIG. 10.

The difference between the second exemplary embodiment and the first exemplary embodiment is that the protruded lines 110 for regulating the lens length are provided in the top and bottom ends of each cylindrical lens in addition to the protruded lines 103 for regulating the lens width. As shown in FIG. 8A, as in the case of the first exemplary embodiment, a light shielding film 102 is patterned on the substrate 101 and a resist having a liquid repellent characteristic is patterned on a plane on the opposite side of the light shielding film 102 to form the two-piece set protruded lines 103 for regulating the width of the cylindrical lenses formed later, and the protruded lines 110 for regulating the length of the cylindrical lenses. Note here that the protruded lines 110 provided on both ends (top and bottom ends) of the lenses 104 are not unified over the entire lenses 104 within the lens sheet 131 but include the sectioning parts 111. Further, the both ends (top and bottom ends) of the two-piece set protruded lines 103 for the lens width exist by going over the lens protruded lines 110.

Note that the light shielding film 102 is not provided on the back face of the protruded lines 110.

This is because it is normally so designed that the ends of the lenses 104 come to locate on the outside of the display region when combining the lens sheet 131 with the display panel.

Figure 8B:
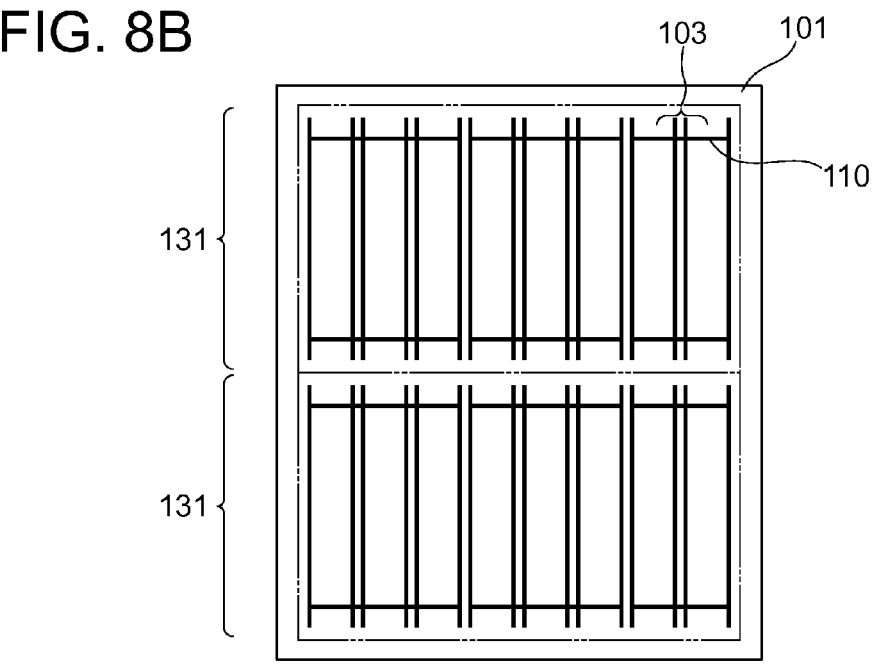
FIG. 8B is a plan view showing a case where the lens sheet of the second exemplary embodiment is taken into multiple faces.
Figure 9A:
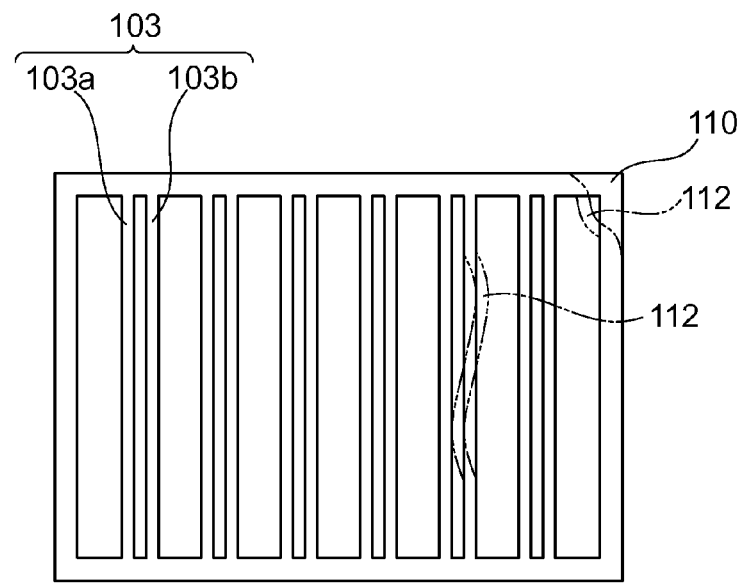
FIG. 9A is a plan view showing a modification example of the second exemplary embodiment.

Whether or not to provide the protruded lines 110 in the lens sheet 131 may be selected as appropriate depending on the conditions such as the uniformity, the stability, and the like of the lens resin dropped later. However, as shown in FIG. 8B, in a case where a plurality of the lens sheets 131 are formed on a single substrate 101, it is necessary to provide the protruded lines 110. It is because cutting of the substrate for cutting the lens sheet 131 into pieces can be easily done when there is no complicated structure such as the lenses 104 or it is because bad-shaped lenses 104 are likely to be formed in the cutting via the lenses 104 due to chipping, breaking, cracking or the like.

The reason for providing the sectioning parts 111 in the protruded lines 110 is to suppress film exfoliation caused due to the stress generated in the protruded lines 103 and the protruded lines 110. In order to retain the lens resin of several tens of μm in height, it is necessary for the heights of the protruded lines 103 and the protruded lines 110 to be about several μm or more. In a case where the protruded lines 103 and the protruded lines 110 are coupled in a grid-like manner in a large area corresponding to the display region of about several tens of inches as in a modification example shown in FIG. 9A, film exfoliation is generated due to the stress and bad-shaped protruded lines 112 may be formed. In order to suppress film exfoliation, it is effective to ease the film stress by sectioning the protruded lines 110. When there is no risk of having film exfoliation, it is unnecessary to section the protruded lines 110.

When forming the sectioning part 111, it is possible to provide the sectioning part 111 without influencing the external shape of the lens 104 by utilizing the isolating part between the left protruded line 103*a* and the right protruded line 103*b* particularly when the protruded line 103 is formed with a set of two lines.

Figure 9B:
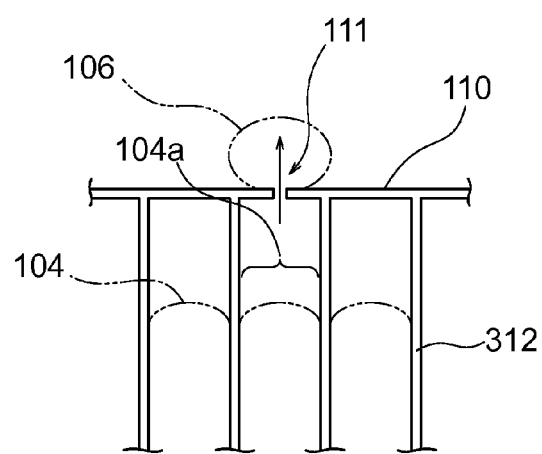
FIG. 9B is a plan view showing a first comparative example of the second exemplary embodiment.

In a case of the protruded line 312 constituted with a single line as in a first comparative example shown in FIG. 9B, there is no choice but to provide the sectioning part 111 of the protruded line 110 in the lens forming region 104*a*. Thus, the lens resin 106 flows out from the sectioning part 111, which results in generating such an issue that the external shape of the lens 104 varies depending on the existence of the sectioning part 111.

The number of the section part 111 to be provided within the lens sheet 131 may be selected as appropriate within a range capable of suppressing film exfoliation. Undoubtedly, the sectioning part 111 can be provided for each protruded line 103, i.e., for each lens forming region 104*a*. Further, unlike the case of FIG. 8A, a set of the protruded lines 110 on the top end and bottom end of the lens 104 may not have to be sectioned at a position crossing with the same protruded line 103, respectively, provided that it is possible to prevent film exfoliation.

The reason for providing the both ends of the protruded line 103 at positions going over the protruded lines 110 is to improve the yield. In a case where the lens resin 106 leaks to the outside of the protruded line 110 as in a second comparative example shown in FIG. 10A, the lens resin 106 flows along the sidewalls of the protruded line 110 and easily flows into the sectioning part 111 that is the isolating part of the protruded line 103. As a result, the lens shape becomes deformed and the yield becomes deteriorated. Thus, as shown in FIG. 10B, when the both ends of the protruded line 103 are provided to go over the protruded line 110, it is possible to prevent the lens resin 106 from flowing into the sectioning part 111.

The width of the protruded line 110 is desirable to be formed in a value with which the lens resin 106 can be stopped fully. However, in order to prevent film exfoliation mentioned above, it may be restricted with a range of some extent depending on the size of the lens sheet 131. In that case, as in a modification example shown in FIG. 10C, it is effective to provide a plurality of protruded lines with a relatively small width. At this time, the sectioning part 111 of the protruded line 110 may be provided at same positions for the protruded line 110*a* and the protruded line 110*b* as in a modification example of FIG. 10C or may be provided at different positions for the protruded line 110*a* and the protruded line 110*b* as long as it is possible to prevent film exfoliation. In that case, the both ends of the protruded line 103 are preferable to be provided at positions going over the outermost side of the protruded line 110*b*.

Next, as shown in FIG. 8A, as in the case of the first exemplary embodiment, the resin is dropped in the lens forming regions 104*a* sectioned by the protruded lines 110 and the protruded lines 103 and cured to form the lenses 104. Thereby, the lens sheet 131 is completed. Then, the lens sheet 131 is laminated with the LCD panel as in the case of the first exemplary embodiment to complete a display panel.

The second exemplary embodiment described above makes it possible to provide the display panel which is capable of displaying different images to a plurality of viewpoints and excellent in the visual characteristic as well as the display quality at a low cost with good yield.

Third Exemplary Embodiment

Figure 13A:
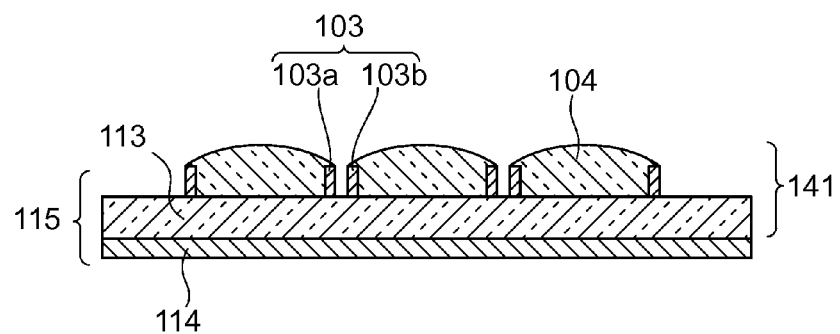
Figure 13B:
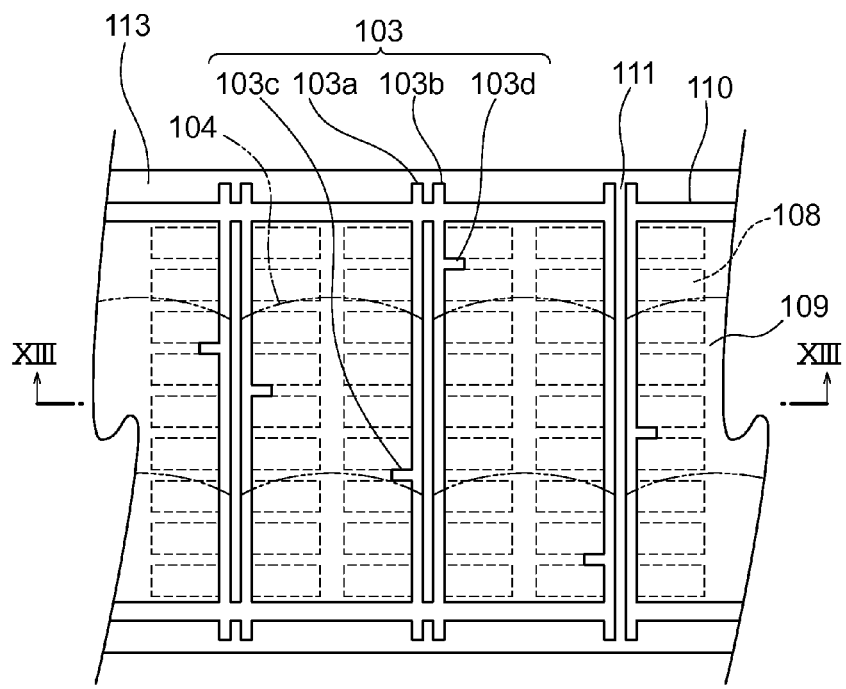

FIGS. 13A and 13B show a lens sheet according to a third exemplary embodiment, in which FIG. 13A is a longitudinal sectional view taken along a line XIII-XIII of FIG. 13B, and FIG. 13B is a plan view. Hereinafter, the lens sheet of the third exemplary embodiment will be described by referring to the drawings.

In a lens sheet 141 of the third exemplary embodiment, a protruded line 103 includes a projected sections 103*c* and 103*d* which are projected from a part in contact with a lens 104 into the inside of the lens 104. That is, a left protruded line 103*a* includes the projected section 103*c* projecting into the inside of the lens 104, and the right protruded line 103*b* includes the projected section 103*d* projecting into the inside of the lens 104.

The lens 104 is deformed when a liquid material contracts at the time when the liquid material is solidified. The degree of deformation becomes larger, as the length of the lens 104 is longer. Thus, it is possible with the lens sheet 141 to suppress deformation of the lens 104 at the time of solidification of the liquid material, since the lens length is practically shortened by the projected section 103*c* and 103*d* which are projected into the inside of the lens 104.

The main steps of the manufacturing method of the lens sheet 141 according to the third exemplary embodiments are as follows. When forming the protruded line 103, the projected section 103c and 103d projecting into the inside the lens 104 are formed in the part of the protruded line 103 in contact with the lens 104.

Other structures of the lens sheet 141 of the third exemplary embodiment, operations, and the effects thereof are the same as those of the first and second exemplary embodiment. The third exemplary embodiment will be described in more details based on FIGS. 11A and 11B to FIGS. 14A and 14B.

The difference of the third exemplary embodiment with respect to the second exemplary embodiment are that the third exemplary embodiment provides the projected sections 103c, 103d which are projected from the sidewalls of the protruded line 103 towards the sidewall of the neighboring protruded lines 103 and that the lens sheet 141 is unified with the color filter substrate 115 of the LCD panel.

Figure 11A:
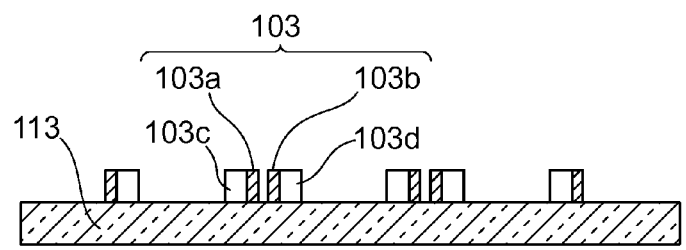
Figure 11B:
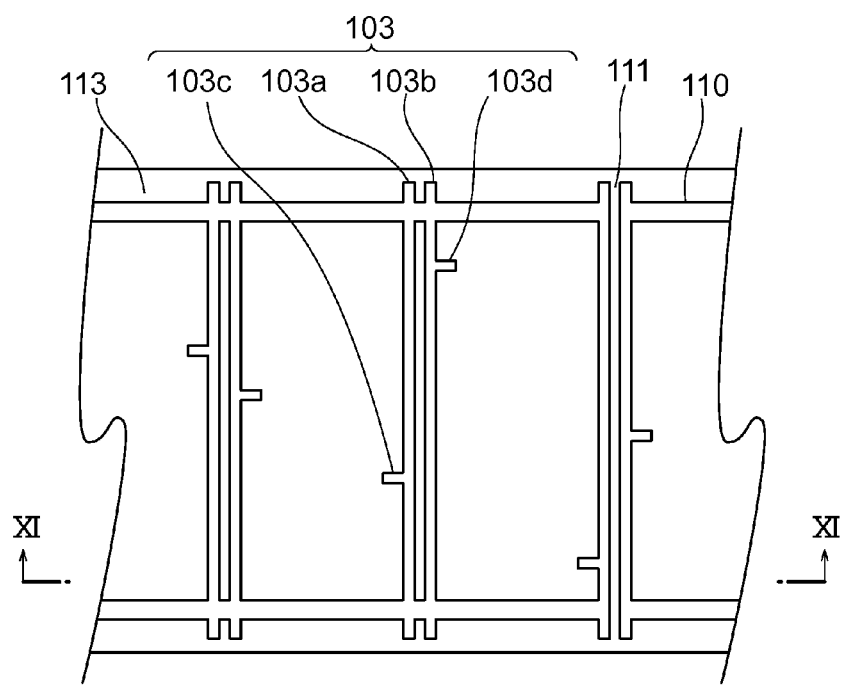

First, as shown in FIGS. 11A and 11B, a resist having a liquid repellent characteristic is patterned on a substrate 113 as in the cases of the first and second exemplary embodiments to form the protruded lines 103 and 110. Note here that the protruded line 103 includes the projected sections 103c and 103d which are projected from the sidewalls towards the sidewalls of the neighboring protruded lines 103. That is, the protruded line 103 includes the projected section 103c projected from the left protruded line 103a towards the right protruded line 103b neighboring on the left side thereof and the projected section 103d projected from the right protruded line 103b towards the left protruded line 103a neighboring on the right side thereof. In FIG. 11A, the protruded line 110 is omitted for simplification.

As disclosed in Japanese Unexamined Patent Publication 2010-160466 (Paragraphs 0038-0041: Patent Document 9), the projected sections 103c and 103d provide an effect of suppressing generation of bad-shaped cylindrical lens in a rectangular shape having a large aspect ratio (long side/short side). In general, when an ultraviolet curable type resin or a thermosetting resin is set, 6% or more volume contraction occurs. However, a substance does not contract in an isotropic manner at the time of contraction, and it is affected by the external shape. As in a comparative example shown in FIG. 12A, regarding a resin 209 applied in a rectangular shape of a large aspect ratio on a substrate, a contraction behavior in the gravity center direction and a contraction behavior in the directions of the center points in each side are combined. As a result, after the resin 209 is set, there is formed a shape 210' in which there is almost no change in the positions of four corners and each side is deformed in an arc-like shape. Thereby, a bad-shaped lens 104' is formed. That is, the contraction amount becomes the maximum in the vicinity of the center points of the long sides, so that the optical property in the center part and that of the ends of the bad-shaped lens 104' become different.

Such issue of generating bad shapes depends on the contraction amount and the aspect ratio of the lens 104, so that it is possible to suppress such issue by dividing the lens 104 along the major axis. However, when the lens 104 is to be divided, the dividing point of the lens 104 naturally becomes a fault point in terms of display. It is essential to shield light at the dividing point of the lens 104 in order to avoid a fault in terms of display. However, a relatively wide range of light shielding causes deterioration of the aperture ratio.

Figure 12A:
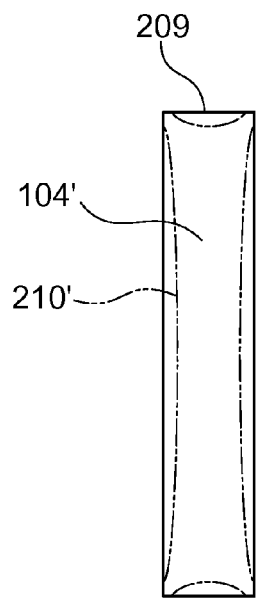
FIG. 12A is a plan view showing a comparative example of the third exemplary embodiment.
Figure 12B:
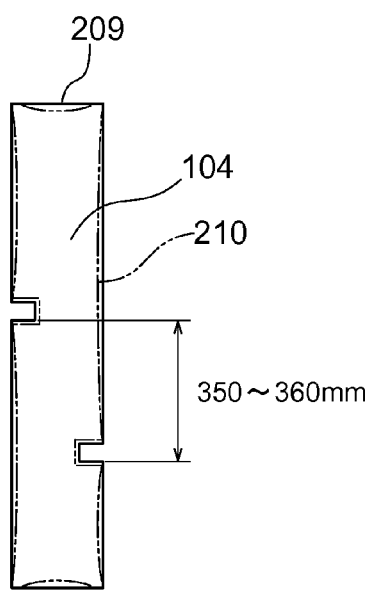
FIG. 12B is a plan view showing a cylindrical lens according to the third exemplary embodiment.

Therefore, dividing the lens with the projected sections 103c, 103d provided to the left protruded line 103a and the right protruded line 103b in the pseudo manner can be a more effective method for solving those complex issues. With the third exemplary embodiment, fine-shaped lenses 104 cannot be acquired without the projected sections 103c and 103d when the long sides of the lens 104 exceeds 370 mm or when the aspect ratio exceeds 880. Based on this result, the placing pitches of the projected sections 103c, 103d are set to be 350 mm to 360 mm, respectively, as shown in FIG. 12B. In the third exemplary embodiment, the lens resin overflows to the top face of the protruded line 103, so that the protruded line 103 exhibits an effect of suppressing the deformation of the resin. This makes it possible to acquire the fine lens shape 210 even in a case of having a relatively large aspect ratio as in the case described above. In a state where the lens resin is pushed against the sidewalls of the protruded line 103, the aspect ratio with which a fine lens shape can be acquired is about 500.

Naturally, the shape of the lens 104 in the periphery of the projected sections 103c and 103d is disturbed. However, the influence thereof is local, and the area of the display fault point is smaller than the case where the lens is completely divided. In a case of an active-matrix type display panel using TFT such as a liquid crystal display or an organic EL (Electro Luminescence) display, the region covering TFT is already light-shielded. Thus, the aperture ratio is not deteriorated when branch light-shielding regions are within an area corresponding to the TFT light-shielding region or smaller.

Then, as shown in FIGS. 13A and 13B, a lens resin is dropped and set as in the case of the first and second exemplary embodiment to form the lenses 104.

Thereafter, a CF layer 114 is formed on the back face of the substrate 113, i.e., a plane on the opposite side of the surface where the protruded lines 103 and 110 are provided. The CF layer 114 is formed by variously combining a black matrix layer (light-shielding layer) formed with a black pigment, a metal film, or the like with color layers of red, green, blue, white (transparent), etc.

The plan shape of the CF layer 114 includes pixel apertures 108 and light-shielding regions 109 as in the case of the first exemplary embodiment (FIG. 6B). At this time, the CF layer 114 is formed in such a manner that the projected sections 103c, 103d are superimposed on the light-shielding regions 109 of the CF layer 114, i.e., the projected sections 103c, 103d come to be located within the projection surface of the light-shielding region 109 when viewed from the normal direction of one plane of the substrate 113.

Through the above, a CF substrate 115 integrated with the lens sheet 141 is formed. Note that the protruded lines 103, 110, and the lenses 104 may be formed after forming the CF layer 114 first.

Figure 14A:
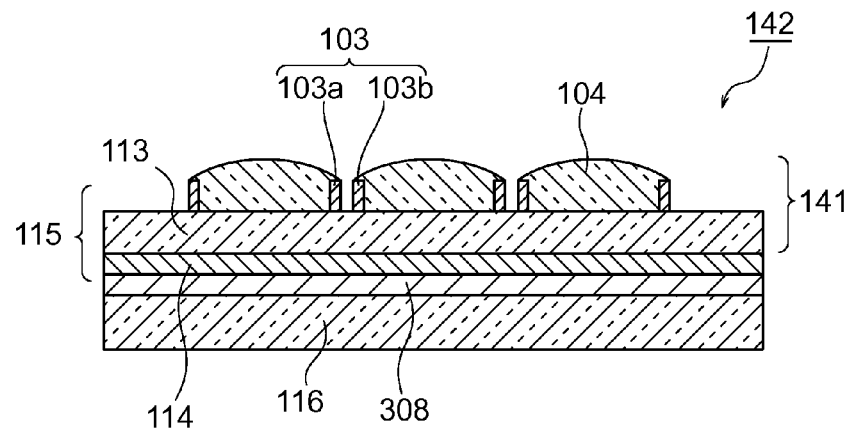
Figure 14B:
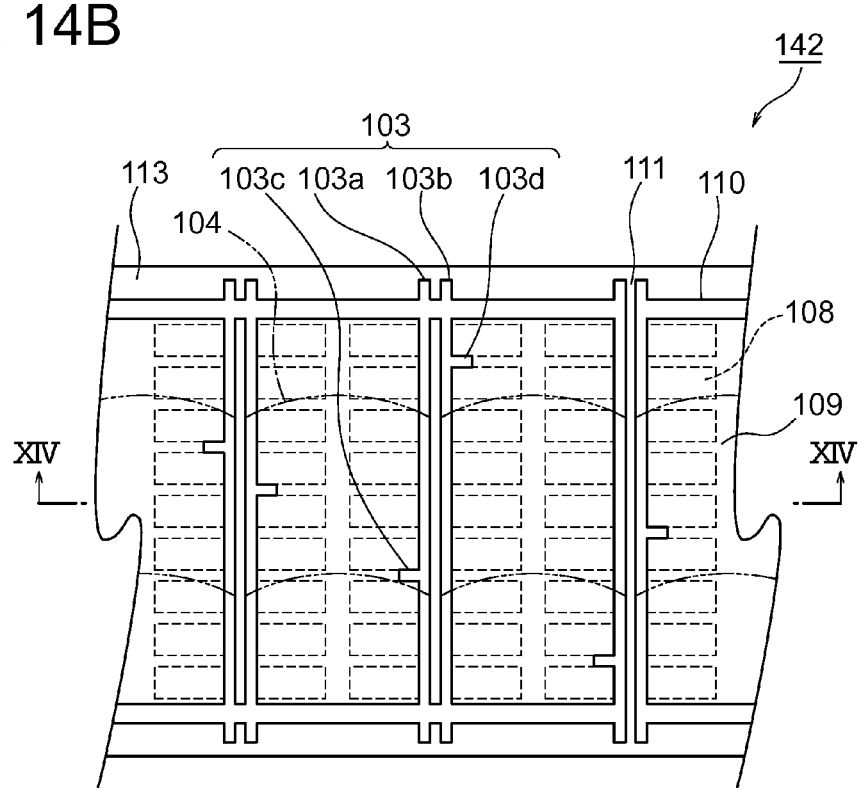

Then, as shown in FIGS. 14A and 14B, the CF substrate 115 and the TFT substrate 116 are laminated, and a liquid crystal 308 is sealed to complete a display panel 142. While the structural elements other than the CF substrate 115, the TFT substrate 116, and the liquid crystal 308 are not illustrated, those are practically same as the structural elements of the LCD panel 320 of the related technique shown in FIG. 15A.

The third exemplary embodiment described above can provide, at a low cost with good yield, the display panel 142 capable of displaying different images to a plurality of viewpoints, which is light in weight and excellent in the visual characteristic as well as the display quality, by using the CF substrate 115 integrated with the lens sheet 141 that is excellent in the lens shape controllability.

Fourth Exemplary Embodiment

Figure 18A:
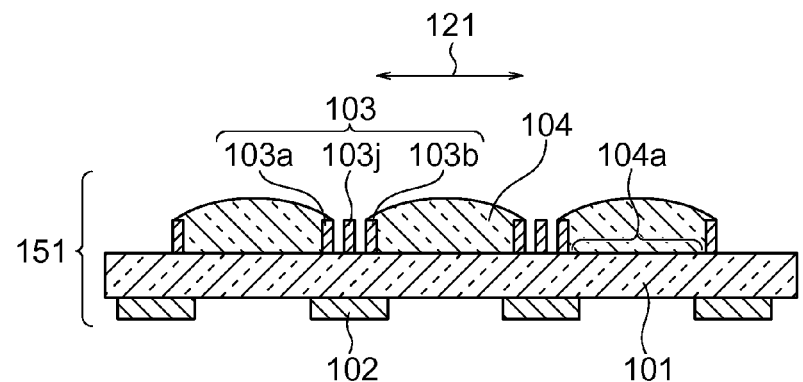
Figure 18B:
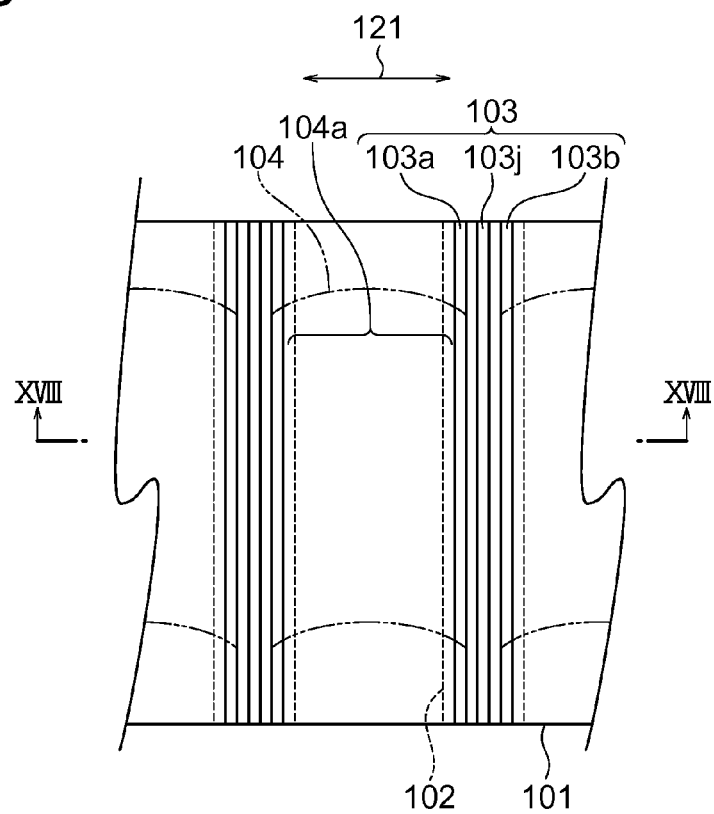

FIGS. 18A and 18B shows a lens sheet according to a fourth exemplary embodiment, in which FIG. 18A is a longitudinal sectional view taken along a line XVIII-XVIII of FIG. 18B, and FIG. 18B is a plan view. Hereinafter, the lens sheet of the fourth exemplary embodiment will be described by referring to the drawings.

The difference of a lens sheet 151 according to the fourth exemplary embodiment with respect to the first exemplary embodiment is that the protruded line 103 is not formed with a set of two lines but formed with a set of three lines. In the fourth exemplary embodiment, unlike the first exemplary embodiment, protruded lines 103*j* are provided as shown in FIGS. 18A and 18B. Therefore, possibilities of contact between the neighboring liquid materials can be decreased further.

While the liquid repellent resist is used for the protruded lines 103 and 110 in the first to fourth exemplary embodiments described above, it is also possible to use a material acquired by applying a liquid repellent agent on a resin film, an inorganic material film, or a metal film. The lens resin is not limited only to the ultraviolet curable resin but may be a thermosetting resin or a resin which cures by a reaction with moisture in the air. The display panel is not limited only to the LCD panel but may be an organic EL display, a plasma display, an electronic paper display, or the like.

The present invention can be summarized as follows.

The lens sheet according to the present invention is characterized as a lens sheet which includes: a substrate; a plurality of cylindrical lenses arranged in parallel at a specific pitch on a plane of the substrate with the extending directions thereof being set to be in parallel; and a plurality of protruded lines which are provided so that the mutually neighboring cylindrical lenses do not overlap with each other, wherein the protruded line between the cylindrical lenses is a set of protruded lines constituted with two lines whose upper edges at least are being isolated.

Further, it is also possible to include a structure in which a protruded line for regulating the length of the cylindrical lenses in the extending directions is provided on the top and bottom ends of the cylindrical lens, and the protruded lines for regulating the length of the cylindrical lenses are not connected to cross over the entire cylindrical lens. The ends of the two protruded lines as a set are desirable to exist by going over the protruded lines on the top and bottom ends of the cylindrical lens.

Further, the two-piece set protruded line may include projected sections projected from the sidewalls of the protruded lines towards sidewalls of neighboring two-piece set protruded lines. It is desirable for the two-piece set protruded line to at least have a liquid repellent characteristic. The display panel according to the present invention is a display panel characterized to include one of the above-described lens sheets.

The effects of the present invention will be described. The lens sheet according to the present invention includes the protruded line constituted with a set of two lines whose ends at least are isolated so that the mutually neighboring cylindrical lenses do not overlap with each other. Thus, it is possible to manufacture a low-cost lens sheet exhibiting a high light-use efficiency with high yield without having fusion of neighboring lenses. Further, through laminating the lens sheet of the present invention with a display panel, it is possible to acquire a display panel capable of displaying different images to a plurality of viewpoints, which is excellent in the visual characteristic and the display quality.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part or a whole part of the exemplary embodiments can be depicted as follows. However, it is to be noted that the present invention is not limited only to the structures described below.

(Supplementary Note 1)

A lens sheet which includes: a substrate; a plurality of cylindrical lenses arranged in parallel at a specific pitch on a plane of the substrate with the extending directions thereof being set to be in parallel; and a plurality of protruded lines which are provided so that the mutually neighboring cylindrical lenses do not overlap with each other, wherein the protruded line between the cylindrical lenses is a set of protruded lines constituted with two lines whose upper edges at least are being isolated.

(Supplementary Note 2)

The lens sheet depicted in Supplementary Note 1, wherein: protruded lines for regulating the length of the cylindrical lenses in the extending directions are provided on the top and bottom ends of the cylindrical lenses; and the protruded lines for regulating the length of the cylindrical lenses are not connected to cross over the entire cylindrical lens.

(Supplementary Note 3)

The lens sheet depicted in Supplementary Note 2, wherein the protruded line for regulating the length of the cylindrical lens is constituted with a set of a plurality of isolated protruded lines.

(Supplementary Note 4)

The lens sheet depicted in Supplementary Note 2 or 3, wherein ends of the two-piece set protruded lines exist by going over the protruded lines at top and bottom ends of the cylindrical lens.

(Supplementary Note 5)

The lens sheet depicted in any one of Supplementary Notes 1 to 4, wherein the two-piece set protruded line include projected sections which are projected from sidewalls of the protruded line towards sidewalls of neighboring two-piece set protruded lines.

(Supplementary Note 6)

The lens sheet depicted in any one of Supplementary Notes 1 to 5, wherein the cylindrical lens is in contact at least with upper surfaces of the two-pieces set protruded line.

(Supplementary Note 7)

The lens sheet depicted in any one of Supplementary Notes 1 to 6, wherein at least the two-piece set protruded line exhibits a liquid repellent characteristic.

(Supplementary Note 8)

A display panel which includes the lens sheet depicted in any one of Supplementary Notes 1 to 7.

(Supplementary Note 9)

A lens sheet manufacturing method which includes: forming a plurality of first protruded lines in parallel at a specific pitch on a substrate formed with a transparent material; applying a liquid material between each of those first protruded lines on the substrate; solidifying the liquid material to form one each of a plurality of cylindrical lenses between the first protruded lines, wherein, when forming the first protruded lines, each of the first protruded lines is constituted with a set of a plurality of protruded lines isolated in the radial direction of the cylindrical lenses formed later.

(Supplementary Note 10)

The lens sheet manufacturing method depicted in Supplementary Note 9, wherein: before applying the liquid material, each of second protruded lines is formed on the substrate at positions to be both ends of the plurality of cylindrical lenses along a center axis direction; and when forming the second protruded lines, each of the second protruded lines is sectioned via the plurality of isolated protruded lines which constitute the first protruded lines at one or more point out of a plurality of points in contact with the plurality of first protruded lines.

(Supplementary Note 11)

The lens sheet manufacturing method depicted in Supplementary Note 10, wherein, when forming the second protruded lines, each of the second protruded lines is constituted with a set of a plurality of protruded lines isolated in the center axis direction of the cylindrical lenses formed later.

(Supplementary Note 12)

The lens sheet manufacturing method depicted in Supplementary Note 10 or 11, wherein, when forming the first protruded lines, both ends of the first protruded lines along the center axis direction are placed to go through the second protruded lines.

(Supplementary Note 13)

The lens sheet manufacturing method depicted in any one of Supplementary Notes 9 to 12, wherein, when forming the first protruded lines, projected sections projecting into the inside of the cylindrical lenses are formed at parts of the first protruded lines in contact with the cylindrical lenses.

(Supplementary Note 14)

The lens sheet manufacturing method depicted in any one of Supplementary Notes 9 to 13, wherein: when forming the first protruded lines, top end surfaces are formed on ends of the first protruded lines not in contact with the substrate; and when applying the liquid material, the liquid material is brought into contact with the top end surface.

(Supplementary Note 15)

The lens sheet manufacturing method depicted in any one of Supplementary Notes 9 to 14, wherein, as a material for the first protruded lines, used is a material exhibiting a liquid repellent characteristic for the liquid material.

(Supplementary Note 21)

A lens sheet which includes: a substrate formed with a transparent material; a plurality of first protruded lines provided on the substrate in parallel at a specific pitch; and a plurality of cylindrical lenses provided one each between the first protruded lines on the substrate, wherein each of the first protruded lines is constituted with a set of a plurality of protruded lines whose upper edges at least are isolated in a radial direction of the cylindrical lenses.

(Supplementary Note 22)

The lens sheet depicted in Supplementary Note 21, wherein the cylindrical lenses are formed with a liquid material applied and solidified between each of the first protruded lines on the substrate.

(Supplementary Note 23)

The lens sheet depicted in Supplementary Note 21 or 22, which further includes second protruded lines provided on the substrate, wherein one each of the second protruded lines is provided on both ends in a center axis direction of the plurality of cylindrical lenses.

(Supplementary Note 24)

The lens sheet depicted in Supplementary Note 23, wherein the second protruded lines are sectioned via the plurality of isolated protruded lines which constitute the first protruded lines at one or more point out of a plurality of points in contact with the plurality of first protruded lines.

INDUSTRIAL APPLICABILITY

The present invention can be utilized for a display device capable of displaying different images to a plurality of viewpoints.

What is claimed is:

1. A lens sheet, comprising:
a substrate formed with a transparent material;
a plurality of first protruded lines provided on the substrate in parallel at a specific pitch; and
a plurality of cylindrical lenses provided one each between the first protruded lines on the substrate, wherein
each of the first protruded lines is constituted with a set of a plurality of protruded lines whose upper edges at least are isolated in a radial direction of the cylindrical lenses.

2. The lens sheet as claimed in claim 1, wherein
the cylindrical lenses are formed with a liquid material applied and solidified between each of the first protruded lines on the substrate.

3. The lens sheet as claimed in claim 1, further comprising second protruded lines provided on the substrate, wherein
one each of the second protruded lines is provided on both ends in a center axis direction of the plurality of cylindrical lenses.

4. The lens sheet as claimed in claim 3, wherein
the second protruded lines are sectioned via the plurality of isolated protruded lines which constitute the first protruded lines at one or more point out of a plurality of points in contact with the plurality of first protruded lines.

5. The lens sheet as claimed in claim 3, wherein
each of the second protruded lines is constituted with a set of a plurality of protruded lines isolated in a center axis direction of the plurality of cylindrical lenses.

6. The lens sheet as claimed in claim 3, wherein
both ends of the first protruded lines along the center axis direction are placed to go through the second protruded lines.

7. The lens sheet as claimed in claim 1, wherein
the first protruded lines include projected sections which are projected from parts in contact with the cylindrical lenses into inside of the cylindrical lenses.

8. The lens sheet as claimed in claim 1, wherein:
the first protruded lines have top end surfaces at ends thereof on a side not in contact with the substrate; and
the cylindrical lenses are in contact with the top end surfaces.

9. The lens sheet as claimed in claim 1, wherein
the first protruded lines exhibit a liquid repellent characteristic for the liquid material.

10. A display panel, comprising the lens sheet claimed in claim 1.

11. An electronic apparatus, comprising the display panel claimed in claim 10.

* * * * *